United States Patent
Izo et al.

(10) Patent No.: US 8,392,007 B1
(45) Date of Patent: Mar. 5, 2013

(54) MOBILE DEVICE AUDIO PLAYBACK

(75) Inventors: Tomas Izo, San Francisco, CA (US); Gal Chechik, Los Altos, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/250,423

(22) Filed: Sep. 30, 2011

Related U.S. Application Data

(63) Continuation of application No. 13/242,520, filed on Sep. 23, 2011.

(51) Int. Cl.
*G06F 17/00* (2006.01)
*H04H 40/00* (2008.01)
*G05B 19/18* (2006.01)

(52) U.S. Cl. ............ 700/94; 455/3.06; 482/901; 700/63

(58) Field of Classification Search .................... 84/612; 455/3.06, 344, 418; 484/3–9, 900, 901; 700/12–14, 700/29–32, 62, 63, 94; 701/213–216; 715/727
See application file for complete search history.

(56) References Cited

U.S. PATENT DOCUMENTS

| | | | |
|---|---|---|---|
| 7,521,623 | B2 | 4/2009 | Bowen |
| 7,732,700 | B2 | 6/2010 | Terauchi et al. |
| 2006/0288846 | A1 | 12/2006 | Logan |
| 2007/0071256 | A1 | 3/2007 | Ito |
| 2007/0074617 | A1 | 4/2007 | Vergo |
| 2007/0074618 | A1 | 4/2007 | Vergo |
| 2007/0074619 | A1 | 4/2007 | Vergo |
| 2007/0079691 | A1* | 4/2007 | Turner ............................ 84/612 |
| 2007/0113725 | A1 | 5/2007 | Oliver et al. |
| 2007/0113726 | A1 | 5/2007 | Oliver et al. |
| 2007/0118043 | A1 | 5/2007 | Oliver et al. |
| 2007/0169614 | A1 | 7/2007 | Sasaki et al. |
| 2008/0051919 | A1 | 2/2008 | Sakai et al. |
| 2008/0103022 | A1 | 5/2008 | Dvorak et al. |
| 2008/0188354 | A1 | 8/2008 | Pauws et al. |
| 2009/0304204 | A1 | 12/2009 | Bieber et al. |
| 2010/0210421 | A1* | 8/2010 | Case et al. ......................... 482/8 |
| 2011/0113330 | A1* | 5/2011 | Olsson et al. .................. 715/716 |

OTHER PUBLICATIONS

Hockman et al. "Real-time Phase Vocoder Manipulation by Runner's Pace," Centre for Interdisciplinary Research in Music Media and Technology (CIRMMT) Mar. 2009, Montreal, QC, Canada (4 pgs.).
U.S. Appl. No. 13/242,520, by Tomas Izo, filed Sep. 23, 2011.

* cited by examiner

*Primary Examiner* — Jesse Elbin
(74) *Attorney, Agent, or Firm* — Shumaker & Sieffert, P.A.

(57) ABSTRACT

This disclosure is directed to providing audio playback to a mobile device user. According to one aspect of this disclosure, a mobile device may be to modify audio playback in response to detecting an inclination of the mobile device (and thereby a user) with respect to a reference plane. According to another aspect of this disclosure, a mobile device may be configured to automatically identify an audible sound that may be motivational to a user, and store an indication of the audible sound in response to the identification. According to another aspect of this disclosure, a mobile device may automatically play back a previously identified motivational song in response to detection of user movement.

6 Claims, 13 Drawing Sheets

MOBILE DEVICE AUDIO PLAYBACK

This application is a continuation of U.S. application Ser. No. 13/242,520 filed Sep. 23, 2011, which is hereby incorporated by reference in its entirety.

TECHNICAL FIELD

In general, this disclosure is directed to techniques for providing audio playback using a mobile device. More specifically, this disclosure is directed to techniques for providing audio playback to improve a user experience when performing a rhythmic exercise such as walking, running, swimming, or cycling.

BACKGROUND

In recent years, it has become increasingly popular for both casual and professional athletes to use portable audio devices, e.g., portable radios, cassette players, compact disk players, and digital audio players (e.g., mp3 players), to listen to music and/or other audio while exercising. For many athletes, listening to audio while exercising may improve the athlete's experience. For example, an athlete may be more inclined to extend a length of an exercise session when entertained by audio. In another example, an athlete may be motivated by audio to improve performance (e.g., to increase a running pace when a fast-paced or otherwise motivational song is played). In another example, a tempo (e.g., a pace of beats) of a particular song may assist an athlete in setting a tempo for exercising.

Today's portable audio devices feature a variety of user interfaces that allow a device user to interact with the device, including electro-mechanical (e.g., button, touchscreen, and microphone input, and audio speaker and vibration output) and electro-optical (e.g., still image/video camera and ambient light sensor input, and LCD display and LED indicator output) user interfaces. Other portable audio devices may feature other means for a user to interact with the device.

Generally, portable audio devices provide device users with audio playback based on user input via a device user interface. In some portable audio devices, audio playback is provided by the device to a user in real time based on direct user input, while in other devices, the audio playback is provided based on a predetermined program (e.g., playlist) created by the user or provided by the portable audio device (auto-playlist) or another computing device (e.g., internet radio). In this manner, portable audio device users desiring playback of one or more particular audio tracks must interact with the user interface of the portable audio device to specify the one or more tracks.

SUMMARY

This disclosure is directed to the playback of audio to a user to improve an exercise experience of the user. The techniques described herein are generally directed to a portable audio device and/or audio device system (hereinafter "mobile device") that may provide audio playback to a user, detect a condition of the mobile device, and modify the audio playback based on the detected condition. According to one aspect, this disclosure describes techniques for detecting a condition of a mobile device (and thereby a user) comprising an inclination with respect to a reference plane, and modifying audio playback based on the detected condition. According to another aspect, this disclosure describes techniques for detecting at least one condition of a mobile device (and thereby a user) in response to an audible sound, and, based on the detected at least one condition, identifying the audible sound as a motivational sound. According to another aspect, this disclosure describes techniques for detecting at least one condition of a mobile device (and thereby a user), and playing back a previously identified motivational sound in response to the detected at least one condition.

For example, a method is described herein. The method includes providing, by a mobile device, audible sound to a user. The method further includes detecting, using at least one sensor of the mobile device, an inclination of the mobile device with respect to a horizontal plane. The method further includes modifying, by the mobile device, the audible sound provided to the user based on the detecting that the inclination of the mobile device with respect to the horizontal plane.

According to another example, a mobile device is described herein. The mobile device includes an audio playback module configured to provide an audible sound to a user. The mobile device further includes an inclination detection module configured to detect, using at least one sensor of the mobile device, an inclination of the mobile device with respect to a horizontal plane. The mobile device further includes means for modifying, by the mobile device, the audible sound provided to the user based on the inclination of the mobile device with respect to the horizontal plane.

According to another example, a computer-readable storage medium is described herein. The computer-readable storage medium stores instructions configured to cause a computing device to provide, using a mobile device, an audible sound to a user. The instructions further cause the computing device to detect, using at least one sensor of the mobile device, an inclination of the mobile device with respect to a horizontal plane. The instructions further cause the computing device to modify, using the mobile device, the audible sound provided to the user based on inclination of the mobile device with respect to the horizontal plane.

According to another example, a method is described herein. The method includes providing, by a mobile device, a first audible sound to a user. The method further includes detecting, using at least one sensor of the mobile device, a first indication of user movement. The method further includes providing, by the mobile device, a second audible sound to the user, wherein the second audible sound is different than the first audible sound. The method further includes detecting, using the at least one sensor of the mobile device, a second indication of user movement in response to providing the second audible sound. The method further includes identifying, based on the second indication of user movement, that the second audible song may be motivational to a user. The method further includes storing at least one indication in association with the second audible sound, the indication representing the motivational attribute of the second audible sound.

According to another example, a mobile device is described herein. The mobile device includes an audio playback module configured to provide a first audible sound to a user. The mobile device further includes a condition detection module configured to detect a first indication of user movement. The audio playback module is further configured to provide a second, different audible sound to the user. The condition detection module is further configured to detect a second, different indication of user movement. The mobile device further includes means for identifying, based on the second indication of user movement, that the second audible song may be motivational to a user. The mobile device further includes an indication storage module configured to store an indication of the second audible sound.

According to another example computer-readable storage medium is described herein. The computer-readable storage medium stores instructions configured to cause a computing device to provide, by a mobile device, a first audible sound to a user. The instructions further cause the computing device to detect, using at least one sensor of the mobile device, a first indication of user movement. The instructions further cause the computing device to subsequently provide, by the mobile device, a second audible sound to the user, wherein the second audible sound is different than the first audible sound. The instructions further cause the computing device to detect, using the at least one sensor of the computing device, a second indication of user movement in response to providing the second audible sound. The instructions further cause the computing device to identify, based on the second indication of user movement, that the second audible song may be motivational to a user. The instructions further cause the computing device to store at least one indication of the second audible sound.

The details of one or more examples are set forth in the accompanying drawings and the description below. Other features, objects, and advantages of these examples will be apparent from the description and drawings, and from the claims.

DETAILED DESCRIPTION

Some techniques for providing audio playback to a user of a mobile device may suffer from certain drawbacks. For example, the user may desire to use the mobile device while exercising in a setting or environment that makes interacting with the device to control audio playback difficult. In some examples, the mobile device may be configured to enable the user to pre-select audio for playback. Playing back audio according to a pre-selected arrangement specified by the user may not be catered to the user's exercise experience.

In some cases, a mobile device may be configured to automatically adapt audio playback to a user's exercise. For example, a mobile device may be configured to determine a desired (e.g., based on user input) or actual (e.g., based on sensing and detection) tempo of user movement (hereinafter "user tempo"), and play back audio that substantially matches the desired or actual user tempo. For example, the mobile device may be configured to automatically determine one or more existing audio tracks that substantially match the desired or actual user tempo, and play back the one or more existing audio tracks. In another example, the mobile device may automatically modify a tempo of one or more existing audio tracks to correspond to the desired or actual user tempo, and play back the one or more modified existing audio tracks. In still other examples, the mobile device may automatically determine one or more existing audio tracks that closely match the desired or actual user tempo, automatically modify a tempo of the one or more existing audio tracks to correspond to the desired or actual user tempo, and play back the one or more modified existing audio tracks.

Figure 1:
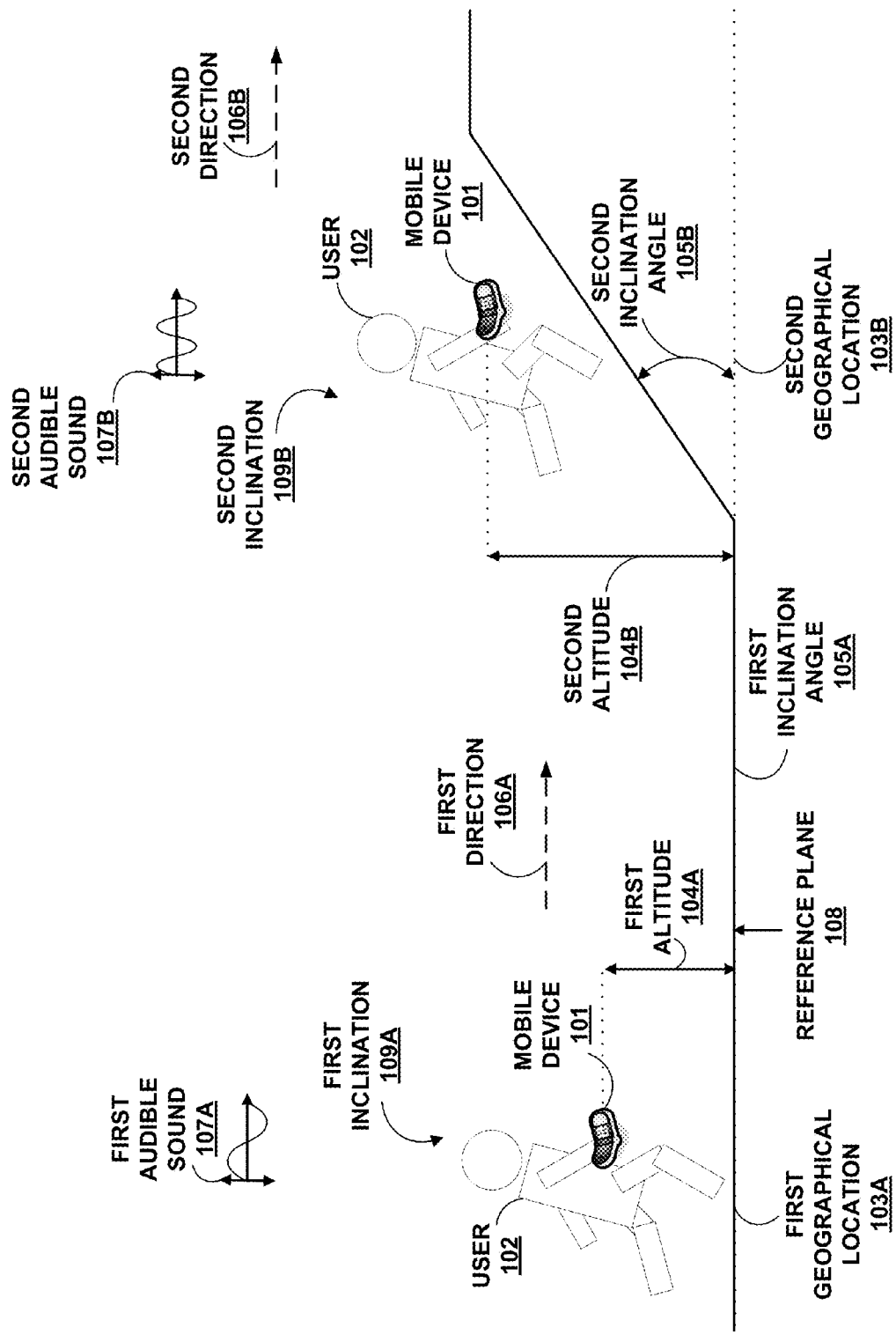
FIG. 1 is a diagram that illustrates one example of a mobile device configured to modify audio playback to a user.

FIG. 1 is a diagram that illustrates one example of a mobile device 101 configured to modify audio playback to a user 102 based on determining an inclination of mobile device 101 with respect to a reference plane 108 (a horizontal reference plane in the example of FIG. 1), according to one or more aspects of this disclosure. As shown in FIG. 1, user 102 may be exercising (e.g., walking or running). While exercising, user 102 may use mobile device 101 to play back audio.

Mobile device 101, as pictured in FIG. 1, is a cellular phone, but may include any type of portable computing device that is capable of audio playback and includes one or more sensors as described herein. For example, mobile device 101 may be a laptop computer, netbook computer, tablet computer, smartphone, portable media player (e.g., mp3 player), wearable computing device (e.g., a watch or similar wearable computing device), or any other device that is capable of playing back audio to a user and includes one or more sensors, as described in further detail below. The example mobile device 101 shown in FIG. 1 is a clamshell-type cellular phone with a tactile button-based user interface. In other examples not shown in FIG. 1, the techniques of this disclosure may also apply to non-clamshell-type mobile devices, such as tablet computers, smartphones, or other devices that may rely primarily on a touchscreen user interface rather than tactile button-based user interface. According to other examples not directly shown herein, mobile device 101 may comprise any portable electronic device that is capable of playing back audible sound and that may be configured to operate according to one or more aspects of this disclosure.

According to one aspect of this disclosure, as shown in FIG. 1, mobile device 101 may be configured to modify audio playback to user 102 based on one or more detected conditions of mobile device 101 (and thereby user 102). For example, mobile device 101 may be configured to modify audio playback based on one or more detected indications of an inclination of mobile device 101 (and user 102). In some examples, mobile device may detect such an indication of an inclination of mobile device 101 (and user 102) when the user is performing an exercise, such as running, walking, swimming, biking or other exercise.

According to one example, mobile device 101 may be configured to provide to user 102 a first audible sound 107A played back at a first tempo. During playback of first audible sound 107A, mobile device 101 may detect, based on one or more sensors of mobile device 101, one or more conditions of mobile device 101 (and thereby user 102). For example, mobile device 101 may detect a first one or more conditions of mobile device 101, such as a first geographical location 103A of mobile device 101 (e.g., global positioning system (GPS) sensor output of positional coordinates), a first altitude 104A of mobile device 101 (e.g., GPS, pressure, and/or altimeter sensor output indicating a relative altitude of mobile device 101 with respect to a reference plane 108 (e.g., a horizontal reference plane), a first inclination angle 105A of mobile device 101 (e.g., GPS sensor output indicating a relative altitude of mobile device 101 with respect to reference plane 108, and accelerometer and/or gyroscope sensor output of angular position with respect to reference plane 108), and/or a first direction of motion 106A of mobile device 101 (e.g., a magnetometer sensor output of a direction in which one or more portions of mobile device 101 are pointed with respect to the magnetic poles of the Earth, such as whether mobile device 101 is pointed north, east, west, south or any combination thereof). According to this example, mobile device 101 may determine a first inclination 109A of mobile device 101 based on the one or more detected conditions of mobile device 101, as set forth above. As one example, mobile device 101 may determine that mobile device 101 is at a first inclination 109A based on the determined first inclination angle 105A with respect to horizontal plane 108.

Mobile device 101 may be further configured to detect a change in the one or more conditions of mobile device 101 (and thereby user 102) using the one or more sensors of mobile device 101. For example, mobile device 101 may detect a second one or more conditions a of mobile device 101, such as a second geographical location 103B of mobile device 101, a second altitude 104B of mobile device 101 with respect to reference plane 108, a second inclination angle 105B of mobile device 101 with respect to reference plane 108, and/or a second direction of motion 106B of mobile device 101. Mobile device 101 may determine, based on the detected second one or more conditions, that mobile device 101 is operating at a second inclination 109B. As one example, as depicted in FIG. 1, mobile device 101 may determine that mobile device 101 is at a second inclination 109B based on the determined second inclination angle 105B with respect to reference plane 108.

As described above, mobile device 101 may be configured to provide to user 102 first audible sound 107A played back at a first tempo. Mobile device 101 may be further configured to, in response to detecting a change in the one or more conditions of mobile device 101 (and thereby user 102), modify audio playback to user 102 to provide user 102 a second audible sound 107B played back at a second tempo different than the first tempo. For example, mobile device 101 may play back second audible sound 107B in response to detecting a change in inclination from inclination 109A to inclination 109B. For example, if mobile device 101 determines an increase in inclination (e.g., from a flat surface to a hill), mobile device 101 may play back second audible sound 107B at a second tempo that is greater than the first tempo of first audible sound 107A. As another example, if mobile device 101 determines a decrease in inclination (e.g., from a hill to a flat surface), mobile device 101 may play back second audible sound 107B at a second tempo that is lower than the first tempo of first audible sound 107A. According to other examples, mobile device 101 may play back second audible sound 107B at a greater tempo in response to a detected decrease in inclination, or at a lower tempo in response to a detected increase in inclination.

In some examples, second audible sound 107B may be the same as or similar to first audible sound 107A (e.g., the same audio track), however played back at a second tempo that is different than the first tempo. In other examples, second audible sound 107B may include an audible sound that is different than first audible sound 107A (e.g., a different audio track with a tempo that is different than the first tempo of first audible sound 107A). In still other examples, second audible sound 107B may include at least a different portion of first audible sound 107A (e.g., a different portion of the same audio track with a tempo that is different than a tempo of a previously-played portion of the audio track). By providing user 102 with second audible sound 107B in response to detecting a transition between first inclination 109A and second inclination 109B, mobile device 101 may operate to adapt audio playback to one or more detected conditions of mobile device 101 (and thereby user 102) while exercising. Accordingly, an experience of user 102 when exercising while using mobile device 101 for audio playback may be improved.

Various examples are described herein, where mobile device 101 is configured to determine a change from inclination 109A to inclination 109B of mobile device 101 (and user 102). According to one example, mobile device 101 may determine a change in inclination based on detecting a difference between first inclination angle 105A (e.g., 0 degrees according to the example shown in FIG. 1) of mobile device 101 with respect to reference plane 108, and second inclination angle 105B of mobile device 101 with respect to reference plane 108 (e.g., using one or more of an accelerometer and/or gyroscope sensors).

According to another example, mobile device 101 may identify first geographical location 103A of mobile device 101 and second geographical location 103B of mobile device 101 (e.g., using a GPS sensor), identify, based on one or more known parameters (e.g., whether a respective geographical location is located on a hill, a flat surface, or other surface) altitude information associated with the respective geographical locations 103A, 103B, and determine, based on the altitude information the respective first inclination 109A and second inclination 109B, as described above. Such known parameters may be stored local to mobile device 101, or accessed elsewhere, such as from another computing device (e.g., a server) communicatively coupled to mobile device 101 by a network.

According to another example, mobile device 101 may determine one or more directions of movement 106A, 106B, of mobile device 101 (e.g., using a magnetometer sensor), identify, based on one or more known parameters (e.g., whether a respective direction of movement leads to a hill, a flat surface, or other surface) and angle of inclination and/or altitude information associated with the respective directions of movement 106A, 106B, and determine, based on the altitude information, the respective first inclination 109A and second inclination 109B, as described above. According to this example, mobile device 101 may use the one or more determined directions of movement 106A, 106B, to determine whether mobile device 101 is traveling uphill (on an incline) or downhill (on a decline). Mobile device 101 may play back second audible sound 107B with a tempo based on the one or more determined directions of movement 106A, 106B. As also consistent with this example, mobile device 101 may determine, based on a change and/or difference in the one or more directions of movement 106A, 106B, that mobile device 101 (and thereby user 102) has turned around to continue along a same path in an opposite direction (e.g., has transitioned from moving uphill to moving downhill).

Mobile device 101 may play back second audible sound 107B with a tempo based on such a determined change and/or difference in the one or more directions of movement 106A, 106B.

According to another example, mobile device 101 may determine a change in inclination from inclination 109A to inclination 109B of mobile device 101 (and thereby user 102) based on a determined altitude of mobile device 101. For example, mobile device 101 may use one or more of an altimeter sensor (e.g., a pressure altimeter, sonic altimeter, or radar altimeter), or a GPS sensor to detect respective altitudes 104A and 104B of mobile device 101 with respect to reference plane 108, and determine a change in inclination of mobile device 101 based on a difference in the detected respective altitudes 104A, 104B (e.g., from first altitude 104A to second altitude 104B, as shown in FIG. 1).

According to the examples described above, mobile device 101 may determine a first inclination 109A and a second inclination 109B based on one or more detected conditions of mobile device 101. Mobile device 101 may detect the one or more conditions of mobile device 101 instantaneously, or as an average. For example, mobile device 101 may detect an instantaneous inclination of mobile device 109A (e.g., a single accelerometer or gyroscope signal that indicates an angle of inclination of mobile device 101). Mobile device 101 may determine a change in an angle of inclination of mobile device 101 by determining a second instantaneous inclination of mobile device 109B In other examples, mobile device 101 may determine first and/or second inclinations 109A, 109B of mobile device based on a plurality of indications of inclination of mobile device averaged over a predetermined time period. For example, mobile device 101 may acquire a plurality of signals indicating accelerometer and/or gyroscope output over a first time period (e.g., a five second time period), and determine a first inclination of mobile device 109A based on an average detected angle of inclination of mobile device 101 at for predetermined time period. To determine second inclination 109B, mobile device may determine an average detected angle of inclination of mobile device 101 over a second time period (e.g., a second five second time period). The techniques described above may be beneficial for a number of reasons. For example, instead of requiring user 102 to interact with mobile device 101 via a user interface (not shown) to manually adjust audio playback of mobile device 101 to accommodate for changes in one or more conditions of user 102 while exercising, mobile device 101 may automatically detect the changes and adjust audio playback to accommodate for the detected changes. As such, user 102 may be able to exercise with less time and effort devoted to operating mobile device 101 than when using equivalent manual input-based techniques for mobile device 101 operation. Accordingly, user 102 may devote more time and effort to exercising. In some examples, the above techniques may be useful when interaction with mobile device 101 by user 102 is impossible, impractical, and/or undesirable (e.g., during exercise).

Figure 2:
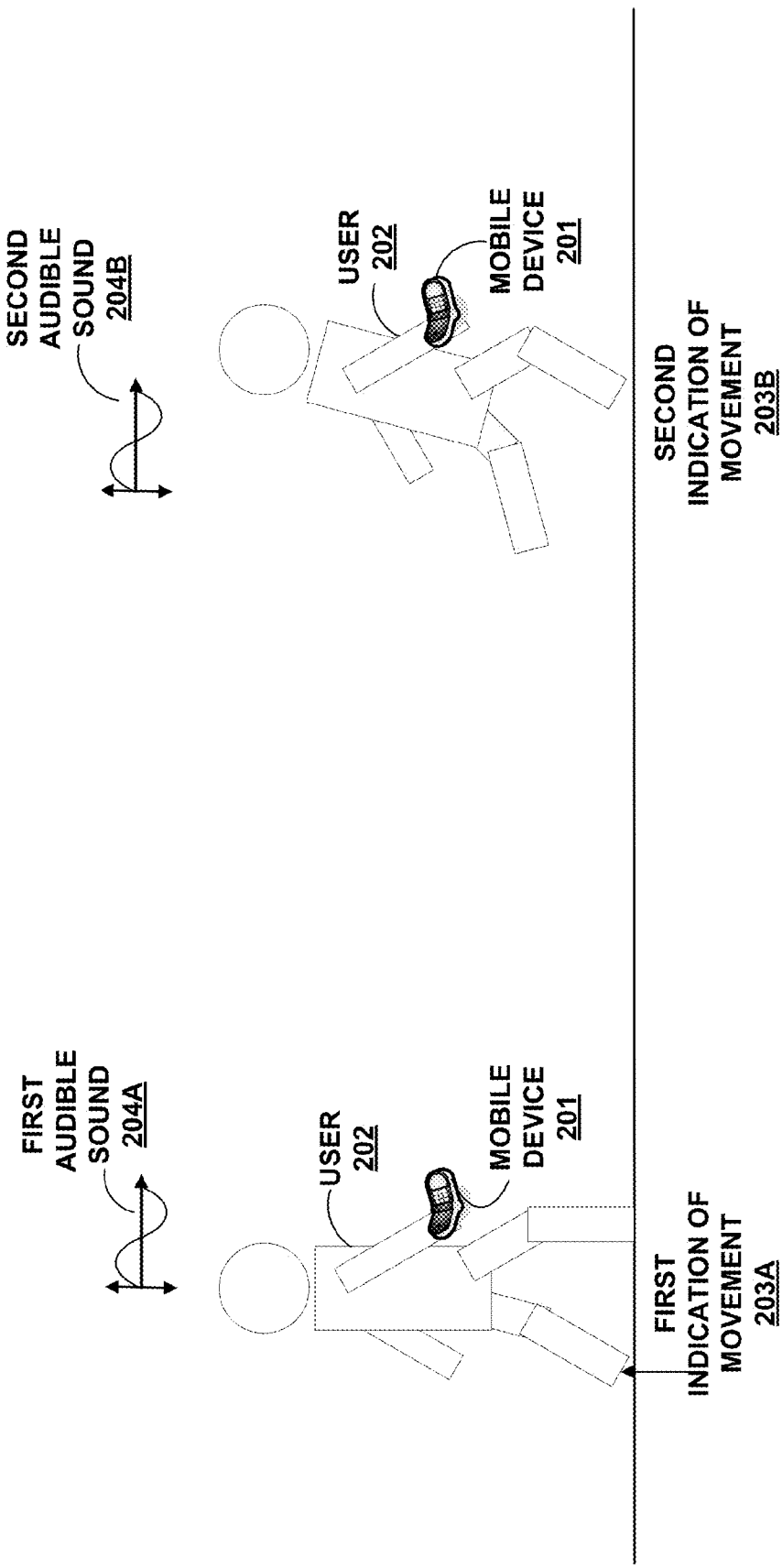
FIG. 2 is a diagram that illustrates one example of a mobile device configured to identify an audible sound as a motivational sound.

FIG. 2 is a diagram that illustrates one example of a mobile device 201 configured to identify and store an indication of an audible sound as a motivational sound based on a detected effect the audible sound has on a user 202, according to one or more aspects of this disclosure. As shown in FIG. 2, user 202 may be exercising (e.g., walking, running, swimming, cycling, skateboarding, cross country skiing, and the like). While exercising, user 202 may use mobile device 201 to play back audio.

According to one aspect of this disclosure, as shown in FIG. 2, mobile device 201 may be configured to provide audio playback to user 202. Mobile device 201 may be further configured to detect a first indication of movement 203A of mobile device 201 (and thereby user 202). For example, mobile device 201 may be configured to detect a first speed or tempo of mobile device 201 (and thereby user 202) while user 202 is exercising.

As one example, mobile device 201 may detect a tempo using an accelerometer or other sensor to detect changes in force/acceleration when user's 202 feet hit the ground while user 202 is running or walking, which may indicate a tempo of user's 202 footsteps. According to other examples, mobile device 201 may instead be configured to communicate with one or more sensors (e.g., pressure, accelerometer, or other sensor) coupled to user's 202 footwear to determine a tempo of user 202 while user 202 is running or walking. According to another example (not shown), mobile device 201 may be configured to communicate with one or more magnetic, optical, or other sensors configured to detect a rate of rotation of the wheels or pedals of a bicycle used by user 202.

As another example, (not depicted in FIG. 2), mobile device 201 and/or other sensors communicatively coupled to mobile device 201 may be configured to detect a rate of movement of mobile device 201 (and thereby user 202). For example, mobile device 201 may be configured to determine a rate of positional change of mobile device 201 (e.g., using a GPS sensor) to determine a rate at which mobile device 201 is moving.

According to another example (not depicted in FIG. 2), mobile device 201 and/or other sensors communicatively coupled to mobile device 201 may be configured to detect a rate of movement of user's 202 skis, legs, or arms when user 202 is cross country skiing. According to another example (not depicted in FIG. 2), mobile device 201 may be configured to use one or more accelerometer and/or gyroscope sensors to detect a tempo of user 202 while user 202 is swimming (e.g., a tempo of arm stroke movement and/or kicking movement of user 202). As another example (not depicted in FIG. 2), first indication of movement 203A of user 202 may include a first tempo and a first inclination (e.g., a detected angle of inclination with respect to a reference plane) of mobile device 201 (and thereby user 202). For example, mobile device 201 may utilize one or more of an accelerometer, gyroscope, GPS, magnetometer, and/or altimeter, or other sensor, to detect a tempo of mobile device 201 (and thereby user 202), as described above, as well as an inclination of mobile device 201 (and thereby user 202), as described above with reference to the example of FIG. 1. As still another example (not depicted in FIG. 2), first indication of movement 203A of user 202 may include a first heart rate of user 202. For example, mobile device 201 and/or other sensors communicatively coupled to mobile device 201 may be configured to detect a heart rate of user 202. For example, mobile device 201 may include at least one touch-sensitive surface. According to this example, mobile device 201 may detect, based on detected contact with a user's skin, determine a heart rate of the user. According to other examples, mobile device 201 may be communicatively coupled to one or more devices comprising a heart rate detection sensor. For example, mobile device 201 may be communicatively coupled with a wearable watch or other device configured to determine a user's heart rate.

In some examples, mobile device 201 may be configured to detect a first indication of movement 203A (e.g., first user tempo, rate of movement, inclination) with respect to a time period. For example, mobile device 201 may be configured to detect a first tempo of a user based on detection of changes in force/acceleration when user's 202 feet hit the ground over a predefined time interval (e.g. five seconds). According to this example, mobile device 201 may detect the first user tempo as an average over such a predefined time interval. In other example, mobile device 201 may detect a first user tempo based on a number of beats of detected tempo. For example, mobile device 201 may detect a first user tempo based on detection of at least two beats. According to this example, mobile device 201 may detect a first user tempo based on a time period between two detected beats of user movement. In other examples, mobile device may detect a user tempo based on more than two beats. For example, mobile device 201 may detect a first user tempo based on a predefined number of beats (e.g., three beats, four beats), and detect the first user tempo based on an average time between detection of the predefined number of beats.

Mobile device 201 may be configured to play back to user 202 a first audible sound 204A and, while first audible sound 204A is being played back for user 202, detect first indication of movement 203A (e.g., a first tempo, speed,) of mobile device 201 (an thereby user 202). Mobile device 201 may transition to playing back a second audible sound 204B. According to some examples, second audible sound 204B may include a different audio track (e.g., a different song) than first audible sound 204A. According to other examples, second audible sound 204B may include a different portion of a same audio track (e.g., portion of a same song) as first audible sound 204A.

Mobile device 201 may further detect a change in movement of mobile device 201. For example, mobile device 201 may detect a second indication of movement 203B of mobile device 201 (and thereby user 202) (e.g., a second tempo, speed, inclination, and/or heart rate) that is different than first indication of movement 203A, in response to playback of second audible sound 204B. In some examples, mobile device 201 may be configured to determine that second audible sound 204B has caused the change in movement of mobile device 201 (and thereby user), and, based on the determined change in movement, identify second audible sound 204B as potentially motivational to user 202.

In some examples, mobile device 201 may be configured to detect a second indication of movement 203B (e.g., first user tempo, rate of movement, inclination) with respect to a time period. For example, mobile device 201 may detect a first tempo of a user based on detection of changes in force/acceleration when user's 202 feet hit the ground over a predefined time interval (e.g. five seconds). Such a predefined time interval may be the same, or different, than a time interval used to determine a first user tempo as described above. In other example, mobile device may detect a second user tempo based on a number of beats of detected tempo. For example, mobile device 201 may detect a second user tempo based on detection of two or more beats of user movement. According to this example, such a predefined number of beats of detected tempo may be the same or different from a number of beats used to determine a first indication of user movement 203A as described above.

According to this example, mobile device 201 may detect a first user tempo based on a time period between two detected beats of user movement. In other examples, mobile device may detect a user tempo based on more than two beats. For example, mobile device 201 may detect a first user tempo based on a predefined number of beats (e.g., three beats, four beats), and detect the first user tempo based on an average time between detection of the predefined number of beats.

As one example, mobile device 201 may detect a change in movement based on identifying that a second detected tempo/speed is greater than a first detected tempo/speed, which may indicate that user 202 is exercising with more effort when listening to second audible sound 204B than when listening to first audible sound 204A. As another example, mobile device 201 may identify that a second inclination is greater than a first inclination (e.g., user 202 has transitioned to running or walking uphill), and that the second tempo/speed has remained the same or is lower than the first tempo, which may also indicate that user 202 is exercising with more effort when listening to second audible sound 204B than when listening to first audible sound 204A. According to this example, mobile device 201 may be configured to compare the second tempo and/or speed and the second inclination to one or more predetermined thresholds, and determine that user 202 may be exercising with more effort based on the comparison.

As another example, mobile device 201 may determine that a second detected heart rate of user 202 is greater than a first detected heart rate of user 202, which may also indicate that user 202 is exercising with more effort when listening to second audible sound 204B than when listening to first audible sound 204A.

As set forth above, mobile device 201 may determine that playback of second audible sound 204B to user 202 may have caused a change in movement based on first indication of movement 203A and second indication of movement 203B (e.g., between the first tempo and the second tempo) of mobile device 201 (and thereby user 202). Based on such a detected change in movement, mobile device 201 may identify second audible sound 204B as a motivational sound.

In some examples, mobile device 201 may store one or more indications of such a motivational sound in response to the identification of second audible sound 204B as motivational. For example, where second audible sound 204B includes a particular song or portion of a particular song, mobile device 201 may store one or more of a digital representation of second audible sound 204B itself (e.g., as an mp3, AAC, WAV, or other format for digital audio data). According to other examples, mobile device may store one or more of an identifier for second audible sound 204B (e.g., an identification of one or more of an artist, album, song name, or track number). In some examples, mobile device 201 may store the one or more digital representations and/or indications of second audible sound 204B in one or more data storage components (e.g., long-term storage, or temporary memory) local to mobile device 201. According to other examples, mobile device 201 may store the one or more digital representations and/or indications external to mobile device 201. For example, mobile device 201 may store the one or more digital representations and/or indications using another computing device and/or data storage component (e.g., a server) communicatively coupled to mobile device 201 using a network.

In some examples, mobile device 201 may be configured to identify such a motivational sound based on other information than described above. For example, once mobile device 201 has detected a change in the tempo and/or speed of mobile device 201 (and thereby user 202) or the heart rate of user 202, as described above with reference to the example of FIG. 2, mobile device 201 may play back a third audible sound (not shown in FIG. 2). Mobile device 201 may further identify one or more conditions of mobile device 201 while the third audible sound is playing. For example, mobile device 201 may determine that mobile device 201 was moving at first tempo 203A and user 202 at a first heart rate (not shown in FIG. 2) while first audible sound 204A was playing, that mobile device 201 was moving at second tempo 203B and user 202 at a second heart rate (not shown in FIG. 2) while second audible sound 204B was playing, and that mobile device 201 was moving at a third tempo (not shown in FIG. 2) and user 202 at a third heart rate (not shown in FIG. 2) while the third audible sound was playing. According to this example, if the second tempo 203B is substantially greater than both first tempo 203A and the third tempo, or, in a similar manner, if the second heart rate is substantially greater than both the first and the third heart rates, mobile device 201 may further ensure that the greater second tempo 203B of device 201 (and thereby user 202), or the second heart rate, was in response to second audible sound 204B. In some examples, mobile device 201 may not identify second audible sound 204B as a motivational track merely based on a comparison of respective tempos of mobile device 201 (and thereby user 202) movement, or heart rates of user 202, during playback of first and second audible sounds 204A and 204B, respectively. Instead, mobile device 201 may only identify second audible sound 204B as motivational if a different tempo or heart rate is detected in comparison to both first audible sound 204A and the third audible sound.

In some examples, mobile device 201 may be configured to determine a motivational score for one or more identified motivational songs. For example, mobile device 201 may identify that an identified motivational sound has caused a change in movement of a user as described above multiple times. According to this example, detecting that a particular identified motivational has caused such a change in movement multiple times may indicate that the particular identified motivational sound is more likely motivational for a user. According to this example, mobile device 201 may increase a motivational score of an identified motivational sound when additional changes in movement in response to play back of the motivational sound are detected. In some examples, the mobile device 201 may play back an indentified motivational sound with a higher motivational score more often than an identified motivational sound with a lower motivational score.

In some examples, mobile device 201 may determine characteristics of one or more identified motivational sounds, and use the determined characteristics to identify other motivational sounds that may or may not have been played back to a user. For example, mobile device 201 may determine one or more characteristics such as an artist, album, genre, tempo, volume level, stabilized auditory image, frequency response, or other characteristic, and use the determined characteristics to identify other songs with similar characteristics that may also be motivational to a user. In some examples, mobile device 201 may be configured to assign a motivational score to an identified motivational sound based on such characteristics. For example, mobile device 201 may increase or decrease a motivational score of an identified motivational sound based on a value associated with one or more characteristics as described above.

According to some examples, mobile device 201 may, based on detected user responses to audible sounds as described above, learn a mapping between audible sound characteristics and a likelihood that one or more of the audible sounds are motivational (e.g., a motivational score as described above). For example, as mobile device 201 determines a user's response to play back of one or more audible sounds, mobile device 201 may identify what characteristics of played back audible sounds cause a change in movement of a user. According to this example, mobile device 201 may learn a mapping that may be used to predict a motivational response to one or more audible sounds. For example, mobile device 201 may use one or more techniques such as regularized polynomial regression, support vector machine (SVM) regression, and or one or more L1-regularized approaches like LASSO or "elastic net" to perform such a mapping.

Such a mapping may be used, for example, to identify audible sounds that may be motivational to a user. Such a mapping may also or instead be used to determine a desired motivational effect of a particular audible sound. For example, mobile device 201 may be determine, based on such a mapping, that a first motivational sound may cause a twenty percent increase in effort by a user, while a second motivational sound may cause a 10 percent increase in effort by the user. According to these examples, mobile device 201 may play back a motivational song based on a desired effect for the user. For example, mobile device 201 may determine a relative need for a user to be motivated based on one or more detected conditions, and play back a motivational song identified to cause an increase in effort consistent with the relative need for motivation.

Figure 3:
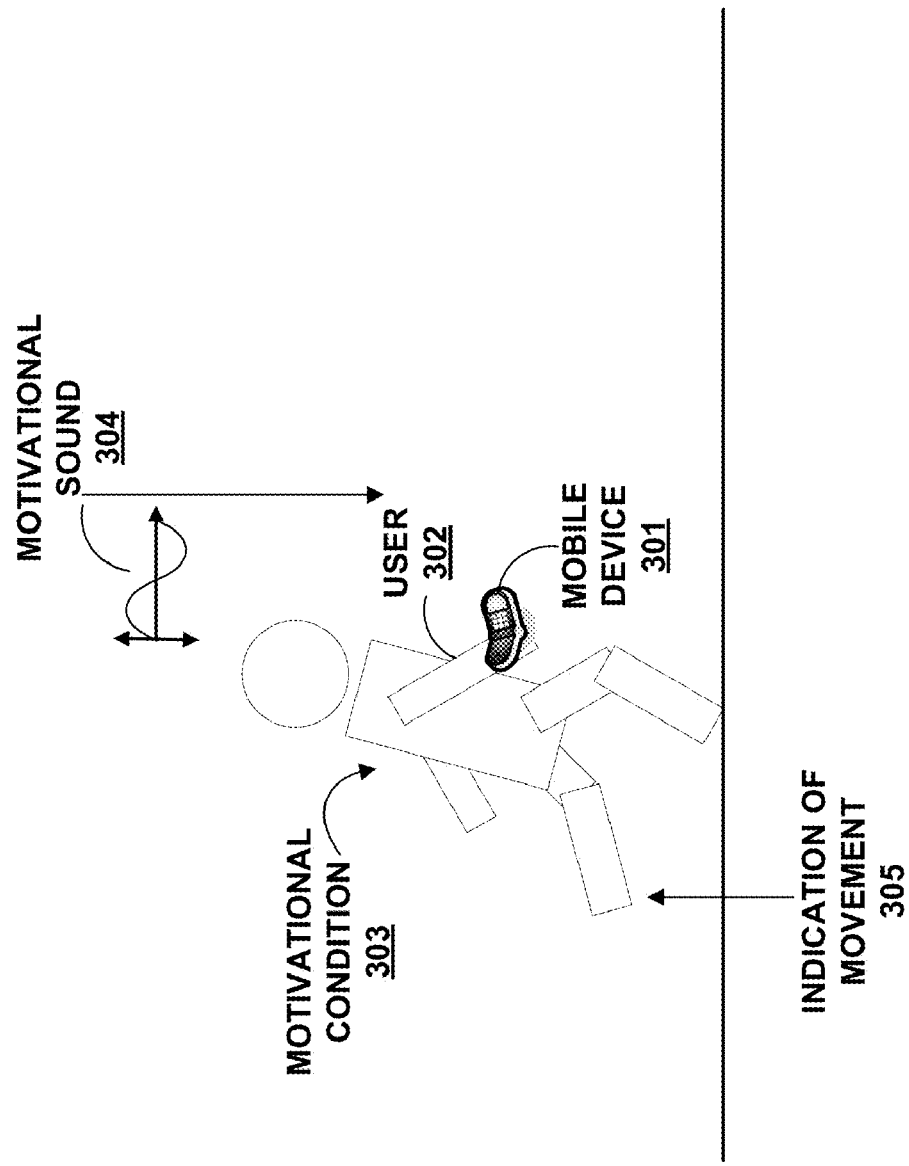
FIG. 3 is a diagram that illustrates one example of a mobile device configured to play back a previously identified motivational sound based on at least one detected condition of the mobile device.

FIG. 3 is a conceptual diagram that illustrates one example of a mobile device 301 configured to play back a previously identified motivational sound 304 based on at least one detected condition of mobile device 301 (and thereby a user 302), according to one or more aspects of this disclosure. According to one example, motivational sound 304 may be identified as motivational prior to being played back based on input received from user 302. For example, user 302 may identify motivational sound 304 as such using a user interface (not shown in FIG. 3) of mobile device 301, or another device (e.g., a computer). According to other examples, motivational sound 304 may be automatically identified as such by mobile device 301, as described above with reference to FIG. 2.

In one example, mobile device 301 may play back motivational sound 304 based on at least one detected condition of mobile device 301 (and thereby a user 302). According another example, mobile device 301 may identify motivational sound 304 as such with respect to a user that is different than user 302, and play back a motivational sound 304 based on at least one detected condition of mobile device 301 (and thereby a user 302).

As shown in FIG. 3, user 302 may be carrying mobile device 301 while exercising (e.g., running or walking). Mobile device 302 may be configured to determine one or more indications of movement 305 of mobile device 301 (and thereby user 302), as described above with reference to the example of FIG. 2. In some examples, mobile device 301 may determine that the one or more indications of movement 305 of mobile device 301 indicate that user 302 may desire motivation (hereinafter referred to as a "motivational condition 303"). As described above with reference to the example of FIG. 2, the one or more indications of motion 305 of mobile device 301 may include a detected tempo, speed and/or inclination of mobile device 301 (and thereby user 302), and/or a heart rate of user 302. In response to detecting one or more motivational conditions 303 based on the one or more indications of movement 305 of mobile device 301, mobile device 301 may play back to user 302 a previously identified-motivational sound 304 (or a sound that is predicted to have a motivating effect). The previously-identified motivational sound may have been identified based on a detected response of the user to previous playback of the motivational sound, or selected based on one or more characteristics similar to characteristics of other identified motivational sounds, as also described above. These techniques may be advantageous, as they may provide user 302 with additional motivation while exercising, without requiring that user 302 interact with mobile device 301. As such, mobile device 301 may be operative to automatically motivate user 302 while exercising, and thereby improve user's 302 experience while using mobile device 301.

In some examples, mobile device 301 may play back a motivational sound identified based on a motivational score of the motivational sound as described above. For example, mobile device 301 may select a motivational sound of a plurality of previously identified motivational sounds based on a motivational score. Such a motivational score may indicate one or more of a likelihood that the identified motivational sound is motivational and/or a desired motivational effect to be caused by the motivational sound. For example, mobile device 301 may play back a first motivational sound with a first motivational score when mobile device detects a user is at a first incline, and play back a second motivational sound with a second, higher motivational score when mobile device is at a second, steeper incline.

Figure 4:
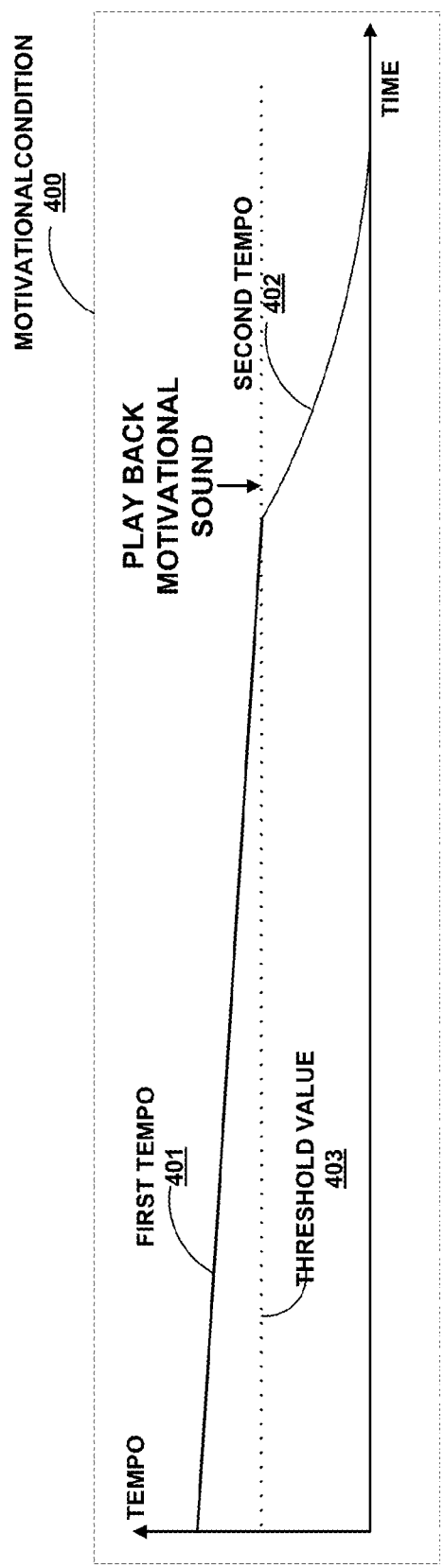
FIGS. 4-6 are diagrams that illustrate various non-limiting examples of one or more motivational conditions that may be detected by a mobile device.
Figure 5:
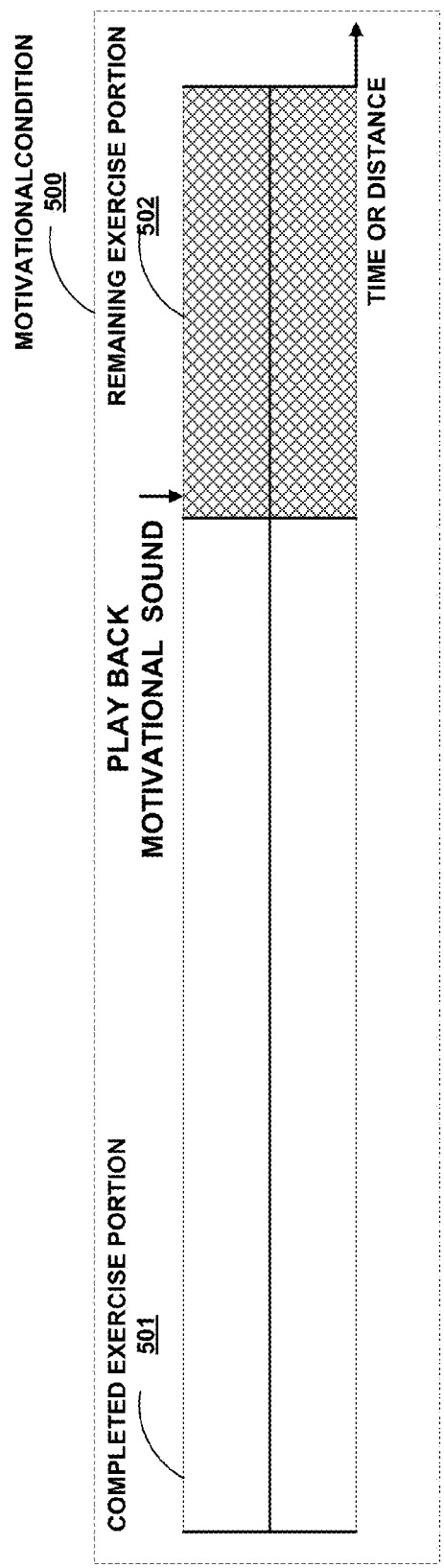
Figure 6:
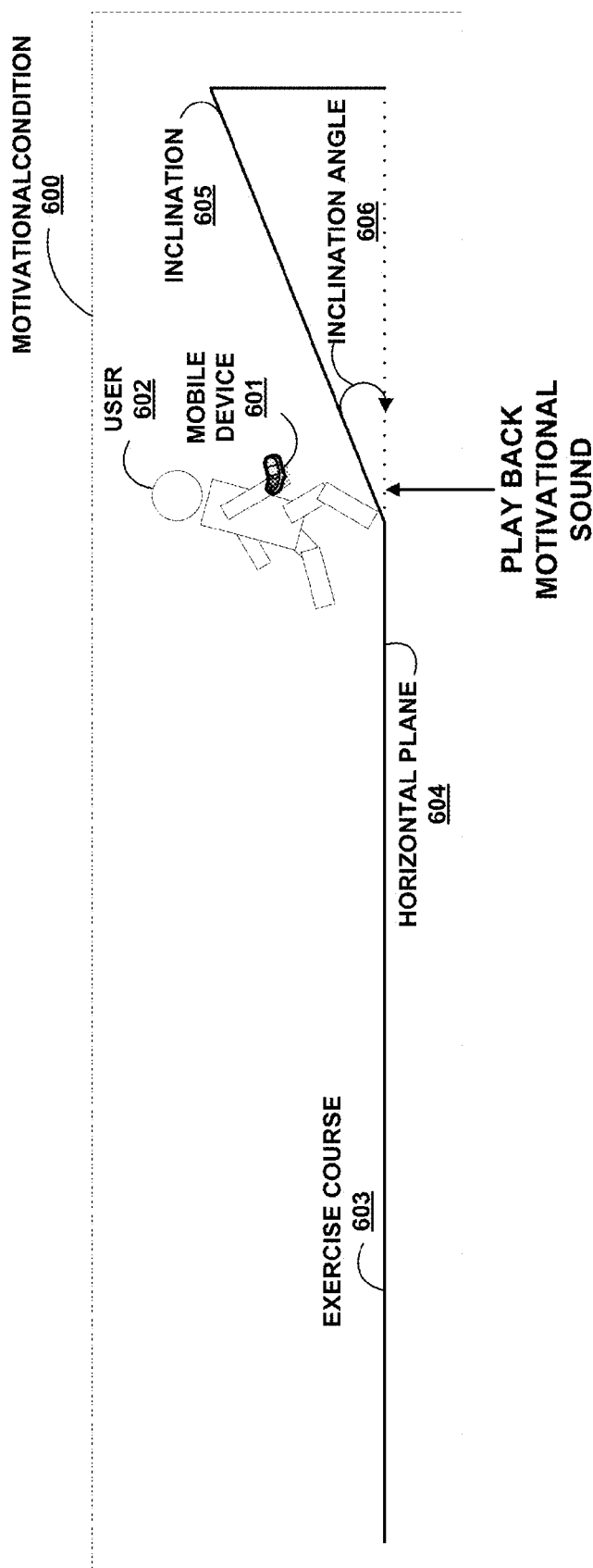

FIGS. 4-6 are diagrams that illustrate various non-limiting examples of the one or more motivational conditions 303 that may be detected by mobile device 301, according to one or more aspects of this disclosure. For example, mobile device 302 may be configured to (as set forth above with reference to the example of FIG. 2) identify that a detected tempo or speed of mobile device 301 (and thereby user 302) has changed. For example, mobile device 302 may identify that the tempo or speed of mobile device 301 has decreased, which may indicate that user 302 is tiring and thus exercising at a slower pace, thereby indicating motivational condition 303. According to one example, with reference to the motivational condition 400 depicted in FIG. 4, mobile device 301 may compare the detected tempo (e.g., second tempo 402) and/or speed of mobile device 301 (and user 302) to a threshold value 403.

According to some examples, threshold value 403 may indicate an absolute value of a tempo (e.g., 60 beats per minute (BPM)) or speed (e.g., 10 kilometers/hour), or a relative percentage with respect to another, earlier detected tempo (e.g., first tempo 401) of mobile device 301 (e.g., second tempo 402 may not fall below 80% of a particular value (e.g., average, maximum, or minimum) of first tempo 401). If mobile device 301 determines that the detected tempo is below threshold value 403, mobile device 301 may determine that one or more motivational conditions 303 exist. According to another example, mobile device 301 may compare a rate of change over time of the detected tempo of mobile device 301 to threshold value 403, where threshold value 403 may indicate a rate of change over time of a tempo (e.g., 5 BPM per minute), or a relative percentage with respect to another, earlier detected rate of change of tempo of mobile device 301 over time (e.g., a rate of change of second tempo 402 may not exceed 120% of a rate of change of first tempo 401). According to this example, if mobile device 301 determines that the rate of change of the detected tempo is greater than threshold value 403, mobile device 301 may determine that one or more motivational conditions 303 exist. As such, in response to determining that one or more motivational conditions 303 exist, mobile device 301 may play back motivational sound 304.

According to another example, mobile device 301 may determine one or more motivational conditions 303 based on a predetermined time and/or distance of movement (e.g., an exercise session). For example, mobile device 301 may be configured to enable user 302 to identify a predetermined length of time for an exercise session (e.g., 1 hour). According to this example, mobile device 302 may determine one or more motivational conditions 303 based on a time period at or near an end of the exercise session (e.g., 10 minutes remaining). According to another example, mobile device 301 may be configured to enable user 302 to identify a predetermined distance for the exercise session (e.g., a 5-mile run). According to this example, mobile device 301 may determine one or more motivation conditions 303 based on a distance at or near an end of the exercise session (e.g., last 0.5 miles).

According to other examples, the predetermined time and/or distance may be identified during a specific portion of the exercise session (e.g., minutes 20-30 of a 1-hour exercise session, or miles 3-4 of a 5-mile exercise session), or a plurality of predetermined times and/or distances during the exercise session (e.g., every 10 minutes, and/or every 0.5 miles). According to these examples, with reference to the motivational condition 500 depicted in FIG. 5, mobile device 301 may detect that mobile device 301 (and thereby user 302) has completed an exercise portion 501. Mobile device 301 may subsequently detect that mobile device 301 has yet to complete a remaining exercise portion 502, indicating that one or more motivational conditions 303 exist. According to both examples set forth above, where user 302 may identify a time and/or a distance of an exercise session, mobile device 301 may play back a previously-identified motivational sound 304 to motivate user 302 to complete a predetermined portion of the exercise session.

According to another example, mobile device 301 may be configured to determine one or more motivational conditions 303 based on a detected environment of mobile device 301 (and user 302). For example, mobile device 301 may be configured to determine a change in an inclination of mobile device 301 (and thereby user 302) as set forth above with reference to the example of FIG. 1. User 302 may have to exercise with more effort when on an inclination, and, therefore, may desire motivation while on the inclination. According to this example, with reference to the motivational condition 600 depicted in FIG. 6, a mobile device 601 may detect that mobile device 601 (and thereby a user 602) is located on an inclination 605 with respect to a horizontal plane 604 of an exercise course 603, indicating one or more motivational conditions 303. According to another example, mobile device 601 may detect that mobile device 601 (and thereby user 602) is located at an inclination angle 606 with respect to horizontal plane 604, also indicating one or more motivational conditions 303 (e.g., inclination angle 606 exceeds a predetermined threshold inclination angle value). According to these examples, mobile device 301 may play back motivational sound 304 in response to the detected environment of mobile device 302, indicating that mobile device 301 (and user 302) is on an inclination.

According to another example (not depicted in FIGS. 4-6), mobile device 301 may be configured to determine one or more motivational conditions 303 based on a determined heart rate of user 302. According to this example, mobile device 301 and/or one or more sensors communicatively coupled to mobile device 301 may be configured to determine the heart rate of user 302. The determined heart rate may indicate that the heart rate of user 302 has decreased, and, therefore, that one or more motivational conditions 303 exist. For example, mobile device 301 may determine that the detected heart rate of user 302 has fallen below a predetermined threshold value, and thereby identify one or more motivational conditions 303. As another example, mobile device 301 may detect that the present heart rate of user 302 has decreased relative to a previous heart rate, and thereby identify one or more motivational conditions 303. According to these examples, mobile device 301 may play back motivational sound 304 in response to the determined heart rate of user 302.

According to another example, mobile device 301 may be configured to enable user 302 to indicate one or more predefined conditions for which motivation is desired. For example, mobile device 301 may provide a user interface (not shown) that enables user 302 to identify a time period (e.g., at 10:30 AM, last ten minutes of an exercise session), distance (e.g., last 0.5 miles of an exercise session), tempo (e.g., if mobile device 301 detects a tempo that falls below 160 BPM), detected heart rate (e.g., detected heart rate of user 302 has fallen below a predefined value), environment (e.g., if any inclination with respect to a reference plane is detected, or if an inclination angle with respect to a reference plane is greater than a predetermined threshold value, such as 10 degrees), or any other indication of a condition for which user 302 desires motivation. According to these examples, mobile device 301 may be configured to detect whether one or more previously identified conditions have occurred, and play back motivational sound 304 if such a previously identified condition has occurred.

The techniques described above may be beneficial for a number of reasons. For example, instead of requiring user 202 to interact with mobile device 201 to play back one or more audible sounds user 202 that may be motivational for user 202, mobile device 201 may automatically identify an audible sound that may be motivational to user 202. The mobile device 201 may further automatically determine a motivational condition 303 where a user may desire motivation, and in response to detecting the motivational condition 303 may play back a previously-identified motivational sound. As such, user 202 may be able to exercise with less time and effort devoted to operating mobile device 201 than when using equivalent manual selection techniques for mobile device 201 operation. Accordingly, user 202 experience may be improved.

Figure 7:
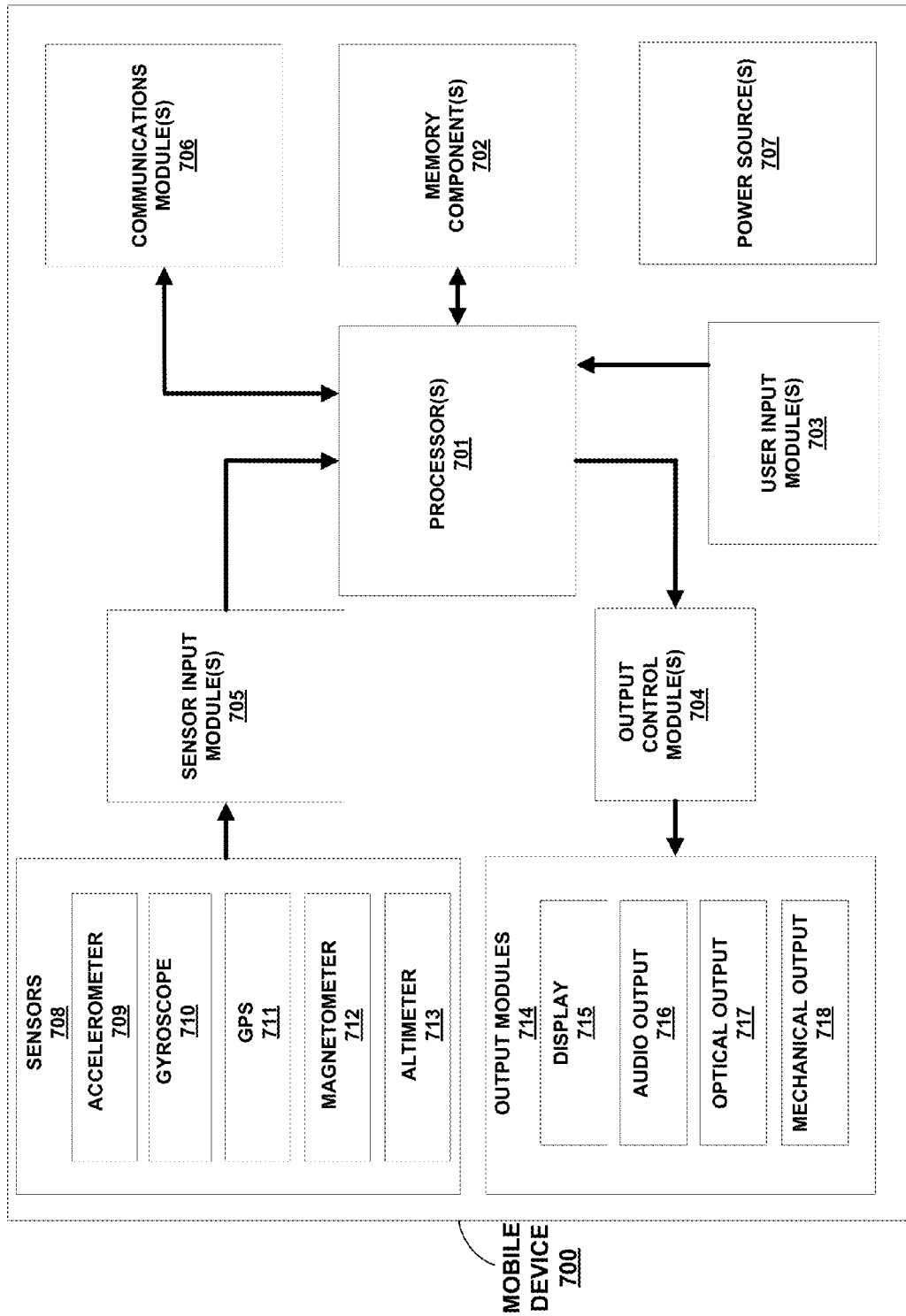
FIG. 7 is a block diagram that illustrates one example of a mobile device.

FIG. 7 is a block diagram that illustrates one example of a mobile device 700 that may be configured to operate consistent with one or more aspects of this disclosure. As shown in FIG. 7, mobile device 700 includes one or more processors(s) 701 (hereinafter processor 701). Processor 701 may include one or more components of mobile device 700 configured to process one or more signals configured to cause mobile device 700 to operate consistent with the techniques of this disclosure. For example, processor 701 may include one or more components (e.g., a central processing unit (CPU)) configured to execute one or more program instructions configured to cause mobile device 700 to operate consistent with the techniques of this disclosure. In other examples, processor 701 may include one or more hardware and/or software components configured to process one or more physical signals (e.g., electrical, mechanical, optical, or the like), configured to cause mobile device 700 to operate consistent with the techniques of this disclosure.

As also shown in FIG. 7, mobile device 700 includes one or more memory component(s) 702 (hereinafter memory component 702) and one or more communications module(s) 706 (hereinafter communications module 706). Memory component 706 may comprise one or more components of mobile device 700 configured to store data and/or program instructions. For example, memory component 702 may include one or more temporary (e.g., random access memory (RAM)) and/or long-term (e.g., magnetic disk, optical disk, or FLASH memory) storage components. In some examples, memory component 702 may store one or more computer-readable instructions that, when executed by processor 701, cause mobile device 700 to operate consistent with the techniques of this disclosure. Communications module 706 of mobile device 700 may include any hardware and/or software components of mobile device 700 configured to enable mobile device 700 to communicate with one or more other devices (not shown in FIG. 7). For example, communications module 706 may include any hardware and/or software component of mobile device 700 configured to enable mobile device 700 to communicate with one or more other devices via a network, such as the Internet. In some examples, processor 701 of mobile device 700 may be configured to execute one or more computer-readable instructions received via communications module 706, instead of, or in addition to one or more instructions stored using memory component 702.

As also shown in FIG. 7, mobile device 700 may also include one or more power source(s) 707 (hereinafter power source 707). Power source 707 may comprise one or more components configured to store energy (e.g., one or more batteries and/or capacitors configured to store electrical energy) to power one or more components of mobile device 700. For example, energy stored by power source 707 may be used to power one or more of processor 701, memory component 702, communications module 706, user input module(s) 703, sensor input module(s) 705, sensors 708, output device module(s) 704, and output modules 714.

As further shown in FIG. 7, mobile device 700 includes one or more user input module(s) 703 (hereinafter user input module 703). User input module 703 may comprise one or more hardware and/or software components of mobile device 700 configured to receive and/or process input from a user. For example, user input module 703 may process user input indicating a desired audio track selected for playback by a user. For example, user input module 703 may be configured to receive from a user one or more indications of one or more audible sounds elected for playback by the user. Non-limiting examples of user input that may be received by user input module 703 include tactile button input (e.g., using a discrete button or keyboard/keypad positioned on a surface of mobile device 700), touch-sense input (e.g., using a touchscreen positioned over a display or other surface of mobile device 700), voice command input (e.g., using a microphone of mobile device 700), and/or any other form of user input configured to indicate a desired audio track selected for playback by a user.

As further shown in FIG. 7, mobile device 700 includes one or more sensor input module(s) 705 (hereinafter sensor input module 705) and one or more sensors 708. Sensor input module 705 may comprise one or more hardware and/or software components of mobile device 700 configured to receive and/or process input from the one or more sensors 708. For example, sensor input module 705 may process sensor input from the one or more sensors 708 indicating one or more of a geographical location, altitude with respect to a reference plane, angular position with respect to a reference plane, and direction of motion with respect to one or more magnetic fields of the Earth, of mobile device 700. Non-limiting examples of sensor input that may be received by sensor input module 705 from the one or more sensors 708 include geographic location (e.g., using a GPS sensor 711 of mobile device 700), altitude with respect to a reference plane (e.g., using accelerometer 709, gyroscope 710, GPS sensor 711, magnetometer 712, and/or altimeter 713 sensors of mobile device 700), angle of inclination with respect to a reference plane (e.g., using accelerometer 709, gyroscope 710, GPS 711, and/or magnetometer 712 sensors of mobile device 700), and/or any other condition of mobile device 700.

As further shown in FIG. 7, mobile device 700 includes one or more output control module(s) 704 (hereinafter output module 704). Output control module 704 may comprise one or more hardware and/or software components of mobile device 700 configured to transmit data to one or more output modules 714. For example, output control module 704 may be configured to transmit data indicating a status of mobile device 700 and/or corresponding to audio data of mobile device 700 to the one or more output modules 714. For example, output control module 704 may be configured to transmit to one or more output modules 714 data indicating one or more of a geographical location, altitude with respect to reference plane, inclination angle with respect to reference plane, direction of motion with respect to a reference plane, relative position, speed, acceleration, and status (e.g., operating mode of mobile device 700, remaining capacity of power source 707) of mobile device 700, as well as audio data corresponding to one or more audible sounds selected for playback by a user and/or by mobile device 700 and various properties of the one or more audible sounds. Non-limiting examples of data that may be transmitted to one or more output modules 714 from output control module 704 include data output to a display device 715 (e.g., one or more liquid-crystal displays (LCD) and/or light-emitting diode (LED) displays indicating status of mobile device 700 and/or various properties of the one or more audible sounds selected for playback), audio output device 716 (e.g., one or more digital-to-analog converters (DAC), amplifiers, and/or electroacoustic transducers providing audio playback to a user of mobile device 700), optical output device 717 (e.g., one or more LEDs and/or miniature light bulbs indicating a status of mobile device 700), and/or mechanical output device 718 (e.g., one or more electromechanical transducers indicating status of mobile device 700).

According to one example with reference to FIG. 7, user input module 703 may be configured to communicate one or more indications of one or more desired audio tracks selected for playback by a user to processor 701. According to this example, processor 701 may be configured to retrieve, based on the one or more indications, data corresponding to the one more desired audio tracks from memory component 702 and/or a remote storage location (e.g., a server) using communications module 706, and transmit the data to output control module 704. According to the example, output control module 704 may be configured to provide, based on the data transmitted by processor 701, a first audio playback (e.g., an audible sound comprising one or more audio segments), using audio output device 716, to a user. Further according to the example, output control module 704 may also provide indication of status of mobile device 700 and various parameters of the one or more desired audio tracks to the user using display device 715 (e.g., display, using an LCD or LED display, a status of mobile device 700 and/or audio track information), optical output device 717 (e.g., indicate, using one or more LEDs, a status of mobile device 700), and mechanical output device 718 (e.g., indicate, using a vibrating motor, a status of mobile device 700).

According to another example with reference to FIG. 7, sensor input module 705 may be configured to communicate one or more conditions of mobile device 700 detected by the one or more sensors 708 of mobile device 700 to processor 701. According to this example, processor 701 may be configured to modify the data corresponding to the one more desired audio tracks, retrieved from memory component 702 or a remote storage location using communications module 706, and transmit the modified data to output control module 704. According to the example, output control module 704 may be further configured to provide, based on the modified data transmitted by processor 701, a second, different audio playback (e.g., an audible sound comprising one or more audio segments), to a user using audio output device 716.

According to still another example with reference to FIG. 7, processor 701 may use the one or more conditions of mobile device 700, detected, using the techniques described above, by one or more sensors 708 in response to playing back the one or more desired audio tracks selected for playback by the user, and communicated by sensor output module 705 to processor 701, to determine an indication that a particular audio track is motivational to the user (e.g., user tempo increases in response to the audio track). According to this example, processor 701 may store the indication local to mobile device 700 using memory component 702, or external to mobile device 700 (e.g., on a remote server) using communications module 706. According to the example, processor 701 may detect, using the techniques descried above, using one or more sensors 708, a motivational condition of the user (e.g., a decrease in user tempo, a remaining time and/or distance in a user exercise, and/or a user incline). Further according to the example, processor 701 may play back, using the techniques described above, an audio track identified as motivational to the user when the motivational condition is detected.

Figure 8:
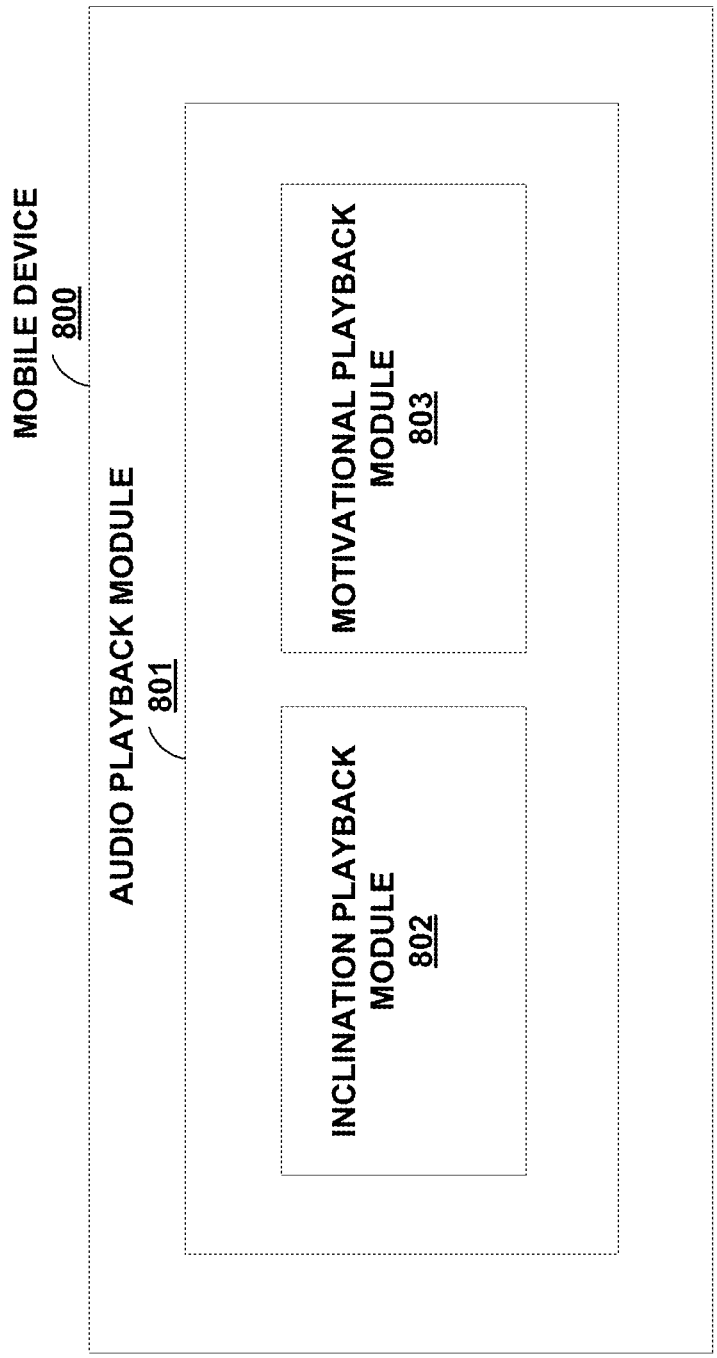
FIG. 8 is a block diagram that illustrates one example of an audio playback module of a mobile device.

FIG. 8 is a block diagram that illustrates one example of an audio playback module 801 of a mobile device 800, consistent with one or more aspects of this disclosure. As shown in FIG. 8, audio playback module 801 may include an inclination playback module 802. Inclination playback module 802 may detect an inclination of mobile device 801 (and a user of mobile device 801), and modify audio playback in response to the detected inclination, as depicted and described above with reference to FIG. 1. Inclination playback module 802 is further discussed below with reference to the example of FIG. 9.

As also shown in FIG. 8, audio playback module 801 may also, or instead, include a motivational playback module 803. According to one example, motivational playback module 803 may be configured to automatically identify one or more motivational sounds, and store the one or more identified motivational sounds for later playback, as depicted and described above with reference to FIG. 2. According to another example, motivational playback module 803 may be configured to detect a motivational condition for which user motivation may be desired, a play back a previously identified motivational sound in response to the detected motivational condition, as depicted and described above with reference to FIGS. 3-6. Motivational song playback module 803 is further discussed below with reference to the example of FIG. 10.

Figure 9:
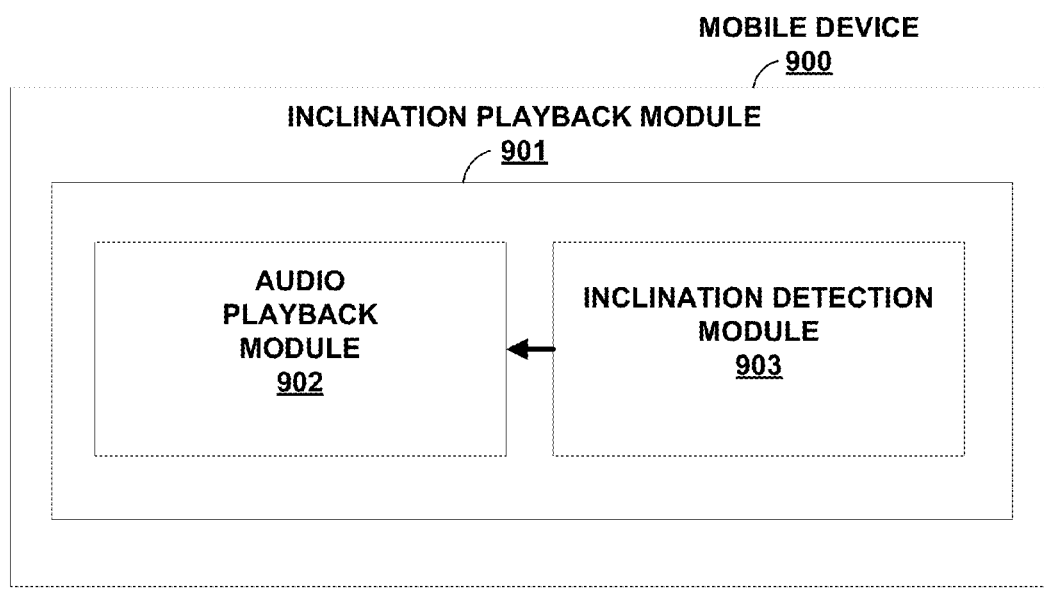
FIG. 9 is a block diagram that illustrates one example of an inclination playback module of a mobile device.

FIG. 9 is a block diagram that illustrates one example of an inclination playback module 901 of a mobile device 900, consistent with one or more of this disclosure. As shown in FIG. 9, inclination playback module 901 may include an audio playback module 902. Audio playback module 902 may be configured to cause audio output to be provided to a user of mobile device 900. For example, audio playback module 902 may be configured to cause audible sound to be output via mobile device 900 (e.g., via audio output module 716, as depicted in FIG. 7). According to one example, audio playback module 902 may be configured to, in response to user input (e.g., received using user input module 703, as depicted in FIG. 7) or other input (e.g., from another computing device) play back a first audible sound (e.g., first audible sound 104A, as depicted in FIG. 1) with a first tempo.

As also shown in FIG. 9, inclination playback module 901 may further include an inclination detection module 903. Inclination detection module 903 may be configured to determine one or more conditions of mobile device 900 that indicate that mobile device 900 (and thereby the user) is on an incline. For example, inclination detection module 903 may be configured to utilize one or more sensors of mobile device 900 to determine one or more conditions that may indicate an inclination of mobile device 900, such as a geographical location of mobile device 900 (e.g., global positioning system (GPS) sensor output of positional coordinates), an altitude of mobile device 900 (e.g., GPS, pressure, and/or altimeter sensor output indicating a relative altitude of mobile device 900 with respect to a reference plane (e.g., a horizontal reference plane tangential to the Earth's surface)), an inclination angle of mobile device 900 (e.g., GPS sensor output of coordinates, or accelerometer and/or gyroscope sensor output of angular position with respect to reference plane), and/or a direction of motion of mobile device 900 (e.g., a magnetometer sensor output of a direction in which one or more portions of mobile device 900 are pointed with respect to the magnetic poles of the Earth, such as whether the device is pointed north, east, west, south or any combination thereof).

According to some examples, inclination module 903 may be configured to further determine a change in an inclination of mobile device 900 based on detecting a change in one or more of the conditions described above. Inclination module 903 may be configured to communicate, to audio playback module 902, an indication of an inclination or change in inclination of mobile device 900. Audio playback module 902 may, in response to a received indication of mobile device 900 inclination, modify audio playback provided to the user. For example, audio playback module 902 may play back a second audible sound (e.g., second audible sound 104B, as depicted in FIG. 1) with a second tempo that is different than the first tempo of the first audible sound. For example, audio playback module 902 may modify the tempo of the first audible sound and play back the first audible sound with the modified tempo, play back an audible sound that is different than the first audible sound, with a tempo that is different than the first tempo of the first audible sound, or play back a different, later portion of the first audible sound that has a tempo that is different than the first tempo of the first audible sound.

Figure 10:
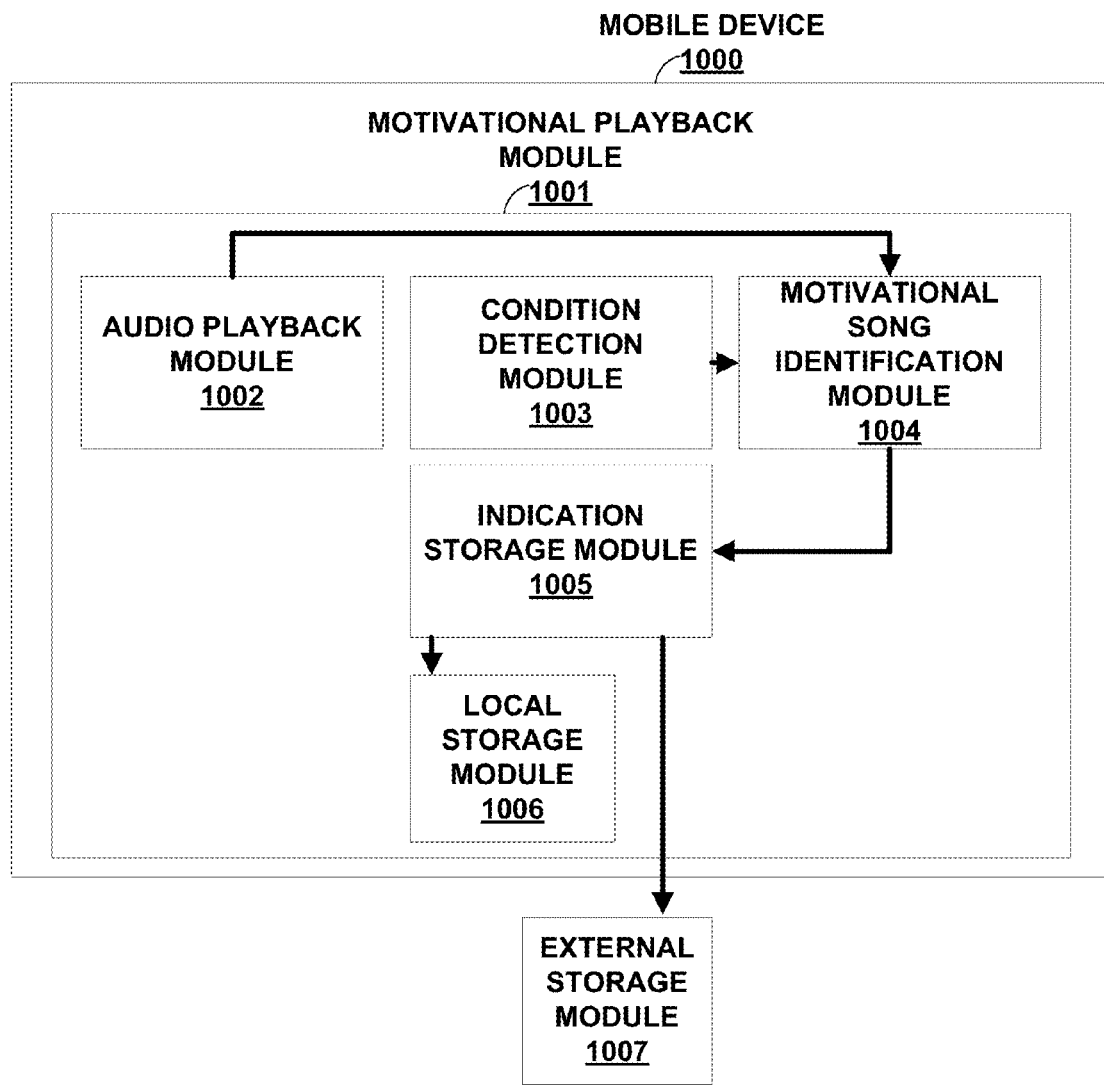
FIG. 10 is a block diagram that illustrates one example of a motivational playback module of a mobile device.

FIG. 10 is a block diagram that illustrates one example of a motivational playback module 1001 of a mobile device 1000, consistent with one or more aspects of this disclosure. As shown in FIG. 10, motivational playback module 1001 may include an audio playback module 1002, a condition detection module 1003, a motivational song identification module 1004, and an indication storage module 1005. Audio playback module 1002 may be configured to cause a first audio output to be provided to a user of mobile device 1000. For example, audio playback module 1002 may be configured to cause a first audible sound to be output via mobile device 1000 (e.g., via audio output module 716, as depicted in FIG. 7). For example, audio playback module 1002 may, in response to a first user input (e.g., received using user input module 703, as depicted in FIG. 7) or other input (e.g., received from another computing device using communications module 706, as depicted in FIG. 7), play back the first audible sound (e.g., first audible sound 204A, as depicted in FIG. 2) with a first tempo.

As also shown in FIG. 10, motivational playback module 1001 may further include a condition detection module 1003. Condition detection module 1003 may determine a first one or more conditions of mobile device 1000 that indicate movement of mobile device 1000 (and thereby the user). For example, condition detection module 1003 may utilize one or more sensors (e.g., sensors 708, as depicted in FIG. 7) of mobile device 1000 to determine one or more conditions that may indicate the movement of mobile device 1000, such as a first speed and/or tempo of mobile device, a heart rate of a user, and/or a inclination of the mobile device.

Audio playback module 1002 may subsequently cause a second, different audio output to be provided to the user of mobile device 1000. For example, audio playback module 1002 may cause a second, different audible sound to be output via mobile device 1000. According to one example, audio playback module 1002 may, in response to a second user input, or other input, play back the second audible sound (e.g., second audible sound 204B, as depicted in FIG. 2) with a second tempo that is different than the first tempo of the first audible sound.

As also shown in FIG. 10, condition detection module 1003 may further determine a second one or more conditions of mobile device 1000 that may indicate movement of mobile device 1000 (and thereby the user). For example, condition detection module 1003 may utilize the one or more sensors of mobile device 1000 to determine the second one or more conditions that may indicate movement of mobile device 1000, such as a second tempo, speed, heartbeat, inclination or other condition as described above. According to some examples, condition indication module 1003 may be configured to further determine (e.g., using processor 701 and memory component 702, as depicted in FIG. 7), a change in movement of mobile device 1000 based on detecting a change in the first and second one or more conditions determined as described above.

Motivational song identification module 1004 may determine whether second audible sound may be motivational to the user, based on one or more detected conditions. For example, motivational song identification module 1004 may determine (e.g., using processor 701 and memory component 702, as depicted in FIG. 7) that the change in the first and second one or more conditions of mobile device 1000 was caused by the second audible sound being played back to the user after playing back the first audible sound. For example, motivational song identification module 1004 may be configured to identify a second audible sound as a motivational track based on detecting one or more of an increase in tempo and/or speed, a relationship between tempo/speed and inclination, and/or an increase in heart rate of a user.

Indication storage module 1005 may be configured to store at least one indication of the second audible sound based on the determined second one or more conditions of mobile device in a local storage component 1006 (e.g., memory component 702, as depicted in FIG. 7), located within the mobile device 1000, or in an storage component located outside of mobile device 1000 (e.g., using communications module 706, as depicted in FIG. 7). For example, indication storage module 1005 may store an indication that identifies a second audible sound, or store a digital representation of the second audible sound that may be played back to reproduce the second audible sound.

In some examples, audio playback module 1002 may play back a third, different audible sound following play back of the second audible sound and detecting the second one or more conditions of mobile device 1000, as described above. According to one example, audio playback module 1002 may, in response to a third user input, or other input, play back the third audible sound, with a third tempo that is different than the second tempo of the second audible sound.

According to this example, condition detection module 1003 may determine a third one or more conditions of mobile device 1000 that may indicate movement of mobile device 1000 (and thereby the user). For example, condition detection module 1003 may be configured to utilize the one or more sensors of mobile device 1000 to determine the third one or more conditions that may indicate movement of mobile device 1000, such as a third tempo, speed, heart rate, inclination, or other condition.

According to some examples, condition indication module 1003 may be configured to further determine a change in movement of mobile device 1000 based on detecting a change in the second and third one or more conditions determined as described above. According to this example, mobile device 1000 may further ensure that the second one or more conditions of mobile device 1000 were in response to second audible sound. Therefore, in some examples, mobile device 1000 may not identify the second audible sound as motivational merely based on a comparison of respective first and second one or more conditions of mobile device 1000 during playback of the first and second audible sounds, respectively. Instead, mobile device 1000 may only identify second audible sound as motivational as a result of a comparison of the first and third one or more conditions to the second one or more conditions of mobile device 1001.

In addition to identifying a motivational sound as described above, in some examples, motivational playback module 803 may automatically play back a previously identified motivational sound based on detecting one or more conditions of movement of a user. Such a previously identified motivational sound may be automatically identified (e.g., using condition detection module 1003 and motivational song identification module 1004), or may be identified based on user input.

In some examples, motivational playback module 803 may automatically play back a previously identified motivational sound at a different time than the motivational sound was identified. For example, motivational playback module 803 may identify a motivational sound during a first user exercise session (e.g., user run), and play back the motivational sound automatically during a second exercise session.

In some examples (e.g., during a second exercise session), condition detection module 1003 may determine, for example, one or more conditions that indicate that a user of mobile device 1000 desires motivation. For example, condition detection module 1003 may determine a decrease in tempo, decrease in speed, decrease in heart rate, or change in a relationship between incline, tempo, and/or heart rate as described above with respect to FIGS. 3-6.

In response to detecting a condition that indicates that a user may desire motivation, audio playback module 1002 may play back a previously identified motivational sound. For example, audio playback module 1002 may interrupt playback of another song to instead play the previously identified motivational sound. In other examples, audio playback module may instead play back a previously identified motivational sound along with other audio output already being played back.

Figure 11:
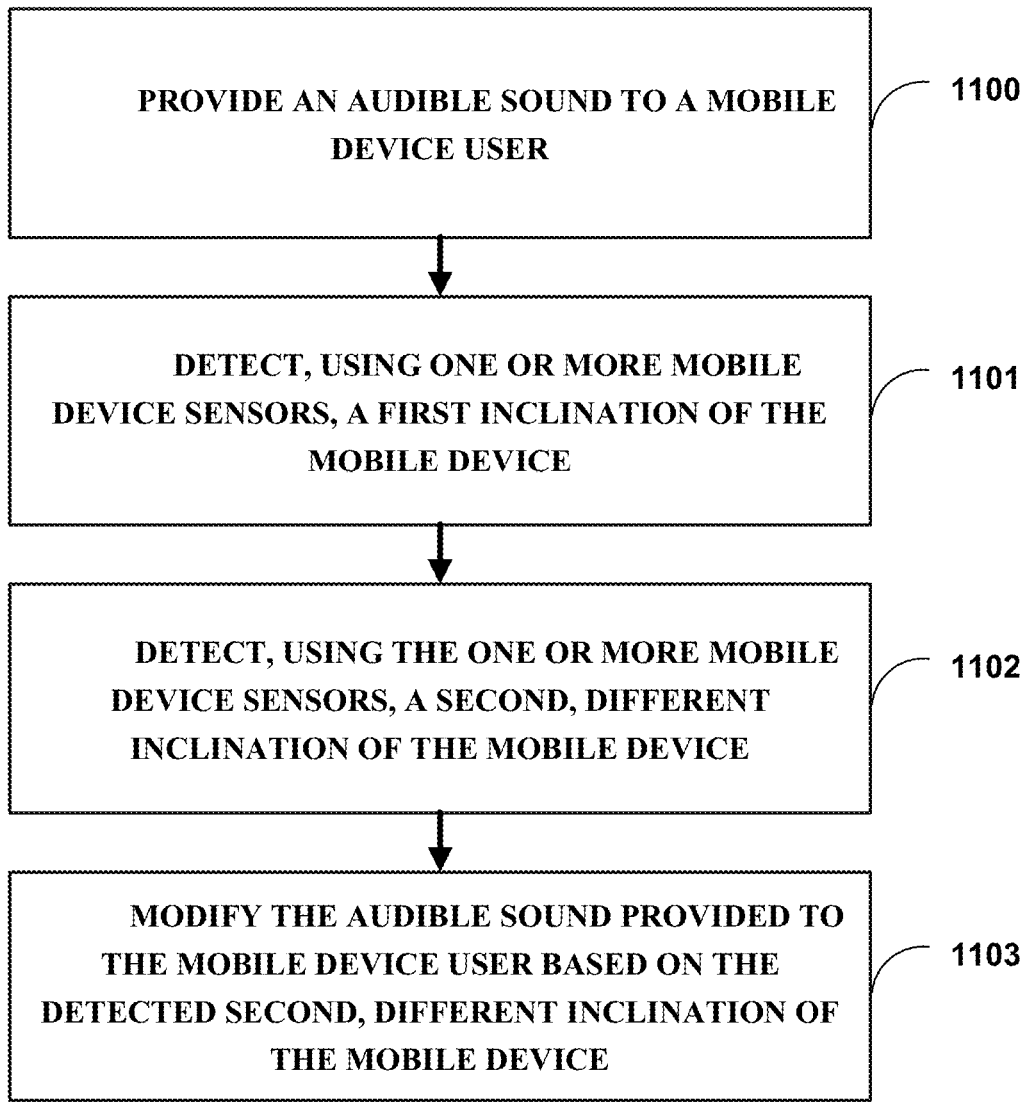
FIG. 11 is a flow diagram that illustrates one example of a process for modifying audio playback based on a detected inclination of a mobile device.

FIG. 11 is a flow diagram that illustrates one example of a method of operating a mobile device consistent with one or more aspects of this disclosure. As shown in FIG. 11, a mobile device (e.g., mobile device 101 as depicted in FIG. 1) may provide (e.g., using audio playback module 902 depicted in FIG. 9) an audible sound (e.g., first audible sound 107A as depicted in FIG. 1) to a user (e.g., user 102 as depicted in FIG. 1) of the mobile device (1100). For example, the mobile device may provide the audible sound in response to receiving (e.g., using user input module 703) one or more real time (e.g., user input via interaction with a mobile device user interface), pre-programmed (e.g., user input via a playlist created by the user via a mobile device user interface), or automatically selected (e.g., internet radio) indications of a desired audible sound selected for playback by the user.

The mobile device may further detect (e.g., using inclination detection module 903 depicted in FIG. 9) that the mobile device is at a first inclination (e.g., first inclination 109A depicted in FIG. 1) (1101). The mobile device may further detect that the mobile device is at a second, different inclination (e.g., second inclination 109B depicted in FIG. 1) (1102). The mobile device may further modify the audible sound provided to the user based on the detected second inclination (1103). For example, the mobile device may play back a different audio track with a different tempo than an audio track comprising first audible sound. According to another example, the mobile device may play back a different portion of a same audible sound with a different tempo than a tempo of the played back portion of the audible sound. According to other examples, the mobile device may modify a tempo or other characteristic of an audible sound and output a modified audible sound (e.g., second audible sound 104B depicted in FIG. 1). For example, the mobile device may modify a tempo of a track comprising the first audible sound, or modify a tempo of another track.

Figure 12:
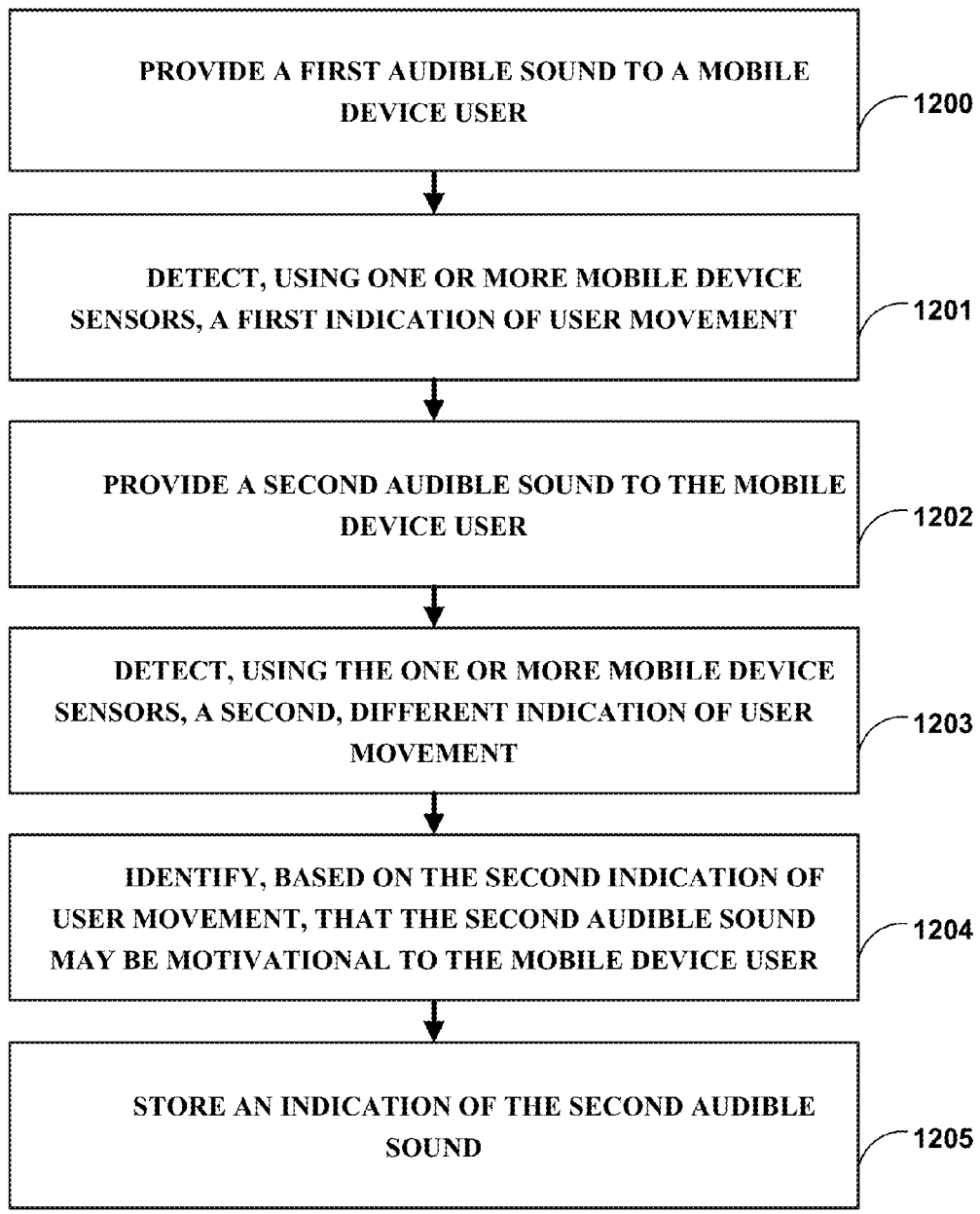
FIG. 12 is a flow diagram that illustrates one example of a process for identifying a motivational sound consistent with one or more aspects of this disclosure.

FIG. 12 is a flow diagram that illustrates another example of a method of operating a mobile device consistent with the techniques of this disclosure. As shown in FIG. 12, a mobile device (e.g., mobile device 201 as depicted in FIG. 2) may provide (e.g., using audio playback module 1002 depicted in FIG. 10) an audible sound (e.g., first audible sound 204A depicted in FIG. 2) to a user (e.g., user 202 as depicted in FIG. 2) of the mobile device (1200). For example, the mobile device may receive (e.g., using user input module 703) one or more real time (e.g., user input via interaction with a mobile device user interface), pre-programmed (e.g., user input via a playlist created by the user via a mobile device interface), or automatically selected (e.g., internet radio) indications of a desired audio track selected for playback by the user.

The mobile device may further detect (e.g., using condition detection module 1003 depicted in FIG. 10) a first indication of movement (e.g., first indication of movement 203A depicted in FIG. 2) (1201). The mobile device may further provide a second, different audible sound (e.g., second audible sound 204B depicted in FIG. 2) (1202). The mobile device may further detect a second, different indication of movement (e.g., second indication of movement 203B depicted in FIG. 2) (1203). The mobile device may further identify (e.g., using motivational song identification module 1004 depicted in FIG. 10), based on the second indication of user movement, that the second audible sound may be motivational to a user (1204). For example, the mobile device may determine that one or more of a tempo, heart rate, and/or inclination of the user has changed in response to play back of the second audible sound. The mobile device may further store (e.g., using indication storage module 1005, local storage module 1006, and external storage module 1007, depicted in FIG. 10) an indication of the second audible sound (1205).

Figure 13:
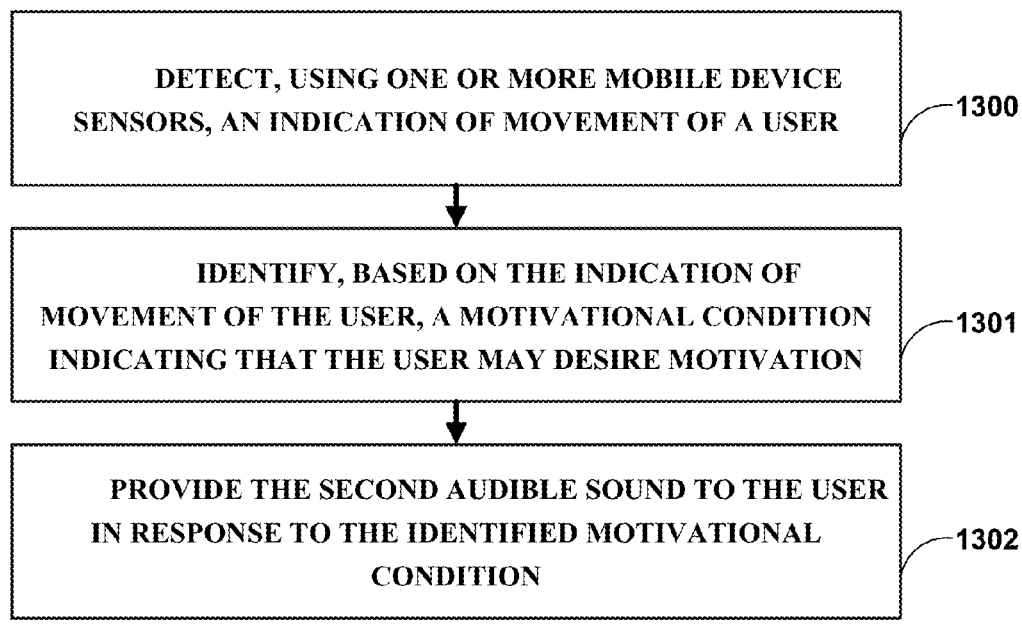
FIG. 13 is a flow diagram that illustrates one example of a process for playing back a previously identified motivational sound.

FIG. 13 is a flow diagram that illustrates another example of a method of operating a mobile device consistent with the techniques of this disclosure. As shown in FIG. 13, a mobile device (e.g., mobile device 301 as depicted in FIG. 3) may detect (e.g., using condition detection module 1003 depicted in FIG. 10) an indication of movement (e.g., indication of movement 305 depicted in FIG. 3) (1300). Mobile device 301 (e.g., using condition detection module 1003 depicted in FIG. 10) may further determine, based on the indication of movement, a motivational condition that indicates that a user may desire motivation (1301). For example, the mobile device may determine that a user may desire motivation based on one or more of a detected tempo, hear rate, inclination of the user, comparison of a distance/time to a predetermined distance or time, or based on any other condition of movement that indicates that a user may desire motivation.

The mobile device may further play back (e.g., using audio playback module 1002 depicted in FIG. 10) a previously identified motivational sound (e.g., motivational sound 304 depicted in FIG. 3) to a user (302 as depicted in FIG. 3) of the mobile device in response to the determined motivational condition (1302). The previously identified motivational song may be identified based on user input indicating that the sound is motivational, or by the mobile device automatically determining the previously identified motivational sound (e.g., as described according to the example of FIG. 12 above).

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations thereof. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described devices, modules, or blocks may be implemented together or separately as discrete but interoperable logic devices. Depiction of different features as modules or blocks is intended to highlight different functional aspects and does not necessarily imply that such modules or units must be realized by separate hardware, firmware, or software components. Rather, functionality associated with one or more modules or blocks may be performed by separate hardware, firmware, or software components, or integrated within common or separate hardware, firmware, or software components.

The techniques described in this disclosure may also be embodied or encoded in a computer-readable medium, such as a computer-readable storage medium, containing instructions. Instructions embedded or encoded in a computer-readable medium, including a computer-readable storage medium, may cause one or more programmable processors, or other processors, to implement one or more of the techniques described herein, such as when instructions included or encoded in the computer-readable medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory (FLASH), a hard disk, a compact disc ROM (CD-ROM), a floppy disk, a cassette, other magnetic media, other optical media, or other computer readable media. In some examples, an article of manufacture may comprise one or more computer-readable storage media.

Various embodiments of the invention have been described. These and other embodiments are within the scope of the following claims.

The invention claimed is:

1. A method comprising:
outputting, by a mobile computing device, an audible sound to a user, wherein outputting the audible sound to the user comprises playing back one or more audio tracks;
detecting, using at least one sensor of the mobile computing device, a change in an inclination of the mobile computing device with respect to a horizontal plane; and
while playing back the one or more audio tracks, modifying, by the mobile computing device, the audible sound output to the user based at least in part on detecting the change in the inclination of the mobile computing device with respect to the horizontal plane, wherein modifying the audible sound output to the user comprises changing a tempo of the audible sound.

2. The method of claim 1, wherein detecting the change in the inclination of the mobile computing device with respect to the horizontal plane comprises using one or more sensors selected from a group consisting of:
an accelerometer;
a gyroscope;
a global positioning system (GPS) sensor;
a magnetometer; and
an altimeter.

3. The method of claim 1, further comprising:
detecting, using the at least one sensor of the mobile computing device, a first inclination of the mobile computing device with respect to the horizontal plane;
detecting, using the at least one sensor of the mobile computing device, a second inclination of the mobile computing device with respect to the horizontal plane that is different than the first inclination; and
modifying, by the mobile computing device, the audible sound in response to detecting that the inclination of the mobile computing device with respect to the horizontal plane has changed from the first inclination to the second inclination.

4. The method of claim 3, wherein detecting, using the at least one sensor of the mobile computing device, the first inclination of the mobile computing device with respect to the horizontal plane comprises detecting a first inclination of a user with respect to the horizontal plane; and
wherein detecting, using the at least one sensor of the mobile computing device, the second inclination of the mobile computing device with respect to the horizontal plane comprises detecting a second inclination of the user with respect to the horizontal plane that is different than the first inclination of the user.

5. A mobile computing device, comprising:
one or more processors;
an audio playback module configured to output an audible sound to a user, wherein to output the audible sound to the user, the audio playback module is configured to play back one or more audio tracks; and
an inclination detection module configured to detect, using at least one sensor of the mobile computing device, a change in an inclination of the mobile computing device with respect to a horizontal plane,
wherein the one or more processors are configured to, while playing back the one or more audio tracks, change a tempo of the audible sound output to the user based at least in part on the detected change in the inclination of the mobile computing device with respect to the horizontal plane.

6. A tangible computer-readable storage medium comprising instructions configured to cause one or more processors of a mobile computing device to:
- output, using the mobile computing device, an audible sound to a user, wherein the instructions that cause the one or more processors to output the audible sound to the user comprise instructions that cause the one or more processors to play back one or more audio tracks;
- detect, using at least one sensor of the mobile computing device, a change in an inclination of the mobile computing device with respect to a horizontal plane; and
- while playing back the one or more audio tracks, modify, using the mobile computing device, the audible sound output to the user based at least in part on the detected change in the inclination of the mobile computing device with respect to the horizontal plane, wherein the instructions that cause the one or more processors to modify the audible sound output to the user comprise instructions that cause the one or more processors to change a tempo of the audible sound.

* * * * *